US012388625B2

(12) United States Patent
Martin et al.

(10) Patent No.: US 12,388,625 B2
(45) Date of Patent: Aug. 12, 2025

(54) TECHNIQUES FOR SECURE DATA EXCHANGES

(71) Applicant: Visa International Service Association, San Francisco, CA (US)

(72) Inventors: Philippe Martin, San Jose, CA (US); Fahimeh Rezaei, Mountain View, CA (US); Marc Kekicheff, Foster City, CA (US); Eric Le Saint, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 303 days.

(21) Appl. No.: 17/631,357

(22) PCT Filed: Jul. 31, 2020

(86) PCT No.: PCT/US2020/044631
§ 371 (c)(1),
(2) Date: Jan. 28, 2022

(87) PCT Pub. No.: WO2021/022221
PCT Pub. Date: Feb. 4, 2021

(65) Prior Publication Data
US 2022/0329415 A1    Oct. 13, 2022

Related U.S. Application Data

(60) Provisional application No. 62/881,231, filed on Jul. 31, 2019.

(51) Int. Cl.
*H04L 9/08*       (2006.01)
(52) U.S. Cl.
CPC .................................. *H04L 9/0825* (2013.01)

(58) Field of Classification Search
CPC ... H04L 9/0825; H04L 9/0841; H04L 9/0822; H04L 9/14; H04L 2209/805; G06F 21/602; G06F 21/6218
See application file for complete search history.

(56) References Cited

U.S. PATENT DOCUMENTS

2016/0248738 A1    8/2016 Brandsma et al.
2017/0169250 A1*   6/2017 White ............... H04L 9/0825
(Continued)

FOREIGN PATENT DOCUMENTS

WO    2019108595 A1    6/2019

OTHER PUBLICATIONS

Application No. EP20845889.3, Extended European Search Report, Mailed On Aug. 23, 2022, 7 pages.
(Continued)

*Primary Examiner* — Khoi V Le
(74) *Attorney, Agent, or Firm* — Kilpatrick Townsend & Stockton LLP

(57) ABSTRACT

Systems and methods are disclosed for performing a secure exchange of encryption keys (e.g., public keys) between two devices. One or more initialization keys are stored at both devices. In some embodiments, at least one device (e.g., a reader device) stores the initialization key(s) (e.g., a symmetric key, an asymmetric key pair) in local memory as part of performance of a manufacturing process for the device. The second device (e.g., a thin client device) may receive the initialization key(s) from an acceptance cloud (e.g., a server computer configured to perform terminal processing). The initialization key(s) are utilized to perform a secure exchange of the devices' respective public keys. Once these public keys are exchanged, the devices may proceed to establishing a secure connection with which subsequent operations may be performed.

19 Claims, 8 Drawing Sheets

(56) References Cited

U.S. PATENT DOCUMENTS

| | | | |
|---|---|---|---|
| 2018/0337899 A1* | 11/2018 | Becker | H04L 9/0852 |
| 2019/0044708 A1* | 2/2019 | Dewan | H04L 9/0897 |
| 2019/0089532 A1* | 3/2019 | Lambert | H04L 63/0853 |
| 2019/0147440 A1* | 5/2019 | Deliwala | G06Q 20/3821 |
| | | | 705/71 |
| 2019/0158468 A1* | 5/2019 | Duong | H04L 51/04 |

OTHER PUBLICATIONS

Application No. PCT/US2020/044631, International Search Report and Written Opinion, Mailed on Nov. 17, 2020, 14 pages.
Office Action, mailed Mar. 13, 2024, in European Patent Application No. EP20845889.3, 6 pages.
Application No. SG11202200047S, Written Opinion, Mailed on Nov. 18, 2024, 9 pages.

* cited by examiner

TECHNIQUES FOR SECURE DATA EXCHANGES

CROSS-REFERENCE TO RELATED APPLICATIONS

This is a 371 Application of PCT/US2020/044631 filed Jul. 31, 2020 which claims priority to U.S. Provisional Patent Application No. 62/881,231, filed on Jul. 31, 2019, the disclosures of which are herein incorporated by reference in their entirety for all purposes.

BACKGROUND

Conventionally, to establish a secure channel between two devices, the devices would need to exchange public keys. This exchange would need to be secure. One conventional approach for sharing public keys is to utilize certificates that are authorized by a certification authority. In these systems, the certification authority's public key and a certificate are required to be stored on each device. In the case of chained certificates, more public key would be required to be stored on each device. The process for establishing a secure channel can be improved.

BRIEF SUMMARY

One embodiment of the invention is directed to a method comprising: identifying, by a protocol management computer, presence of a reader device utilizing a near field communications channel; obtaining, from a remote server computer, a first initialization key associated with the reader device, a second initialization key corresponding to the first initialization key being previously stored at the reader device during a manufacturing process of the reader device; receiving, by the protocol management computer via the near field communications channel, first encrypted data comprising a first public key associated with the reader device; and transmitting, by the protocol management computer via the near field communications channel, second encrypted data comprising a second public key associated with the protocol management computer, wherein at least one of the first or second encrypted data is encrypted based at least in part on at least one of the first initialization key or the second initialization key.

Another embodiment of the invention is directed to a protocol management computer (e.g., a thin client device) programmed to perform the above-noted method.

Another embodiment of the invention is directed to a reader device programmed to perform operations comprising: storing, during a manufacturing process of the reader device, a first initialization key; receiving, from a protocol management computer, a communication via a near field communications channel; in response to receiving the communication, transmitting, via the near field communications channel, first encrypted data comprising a first public key associated with the reader device; and receiving, from the protocol management computer, via the near field communications channel, second encrypted data comprising a second public key associated with protocol management computer, wherein at least one of the first or second encrypted data is encrypted based at least in part on the first initialization key or a second initialization key stored at the protocol management computer.

Further details regarding embodiments of the invention can be found in the Detailed Description and the Figures.

DETAILED DESCRIPTION

Figure 1:
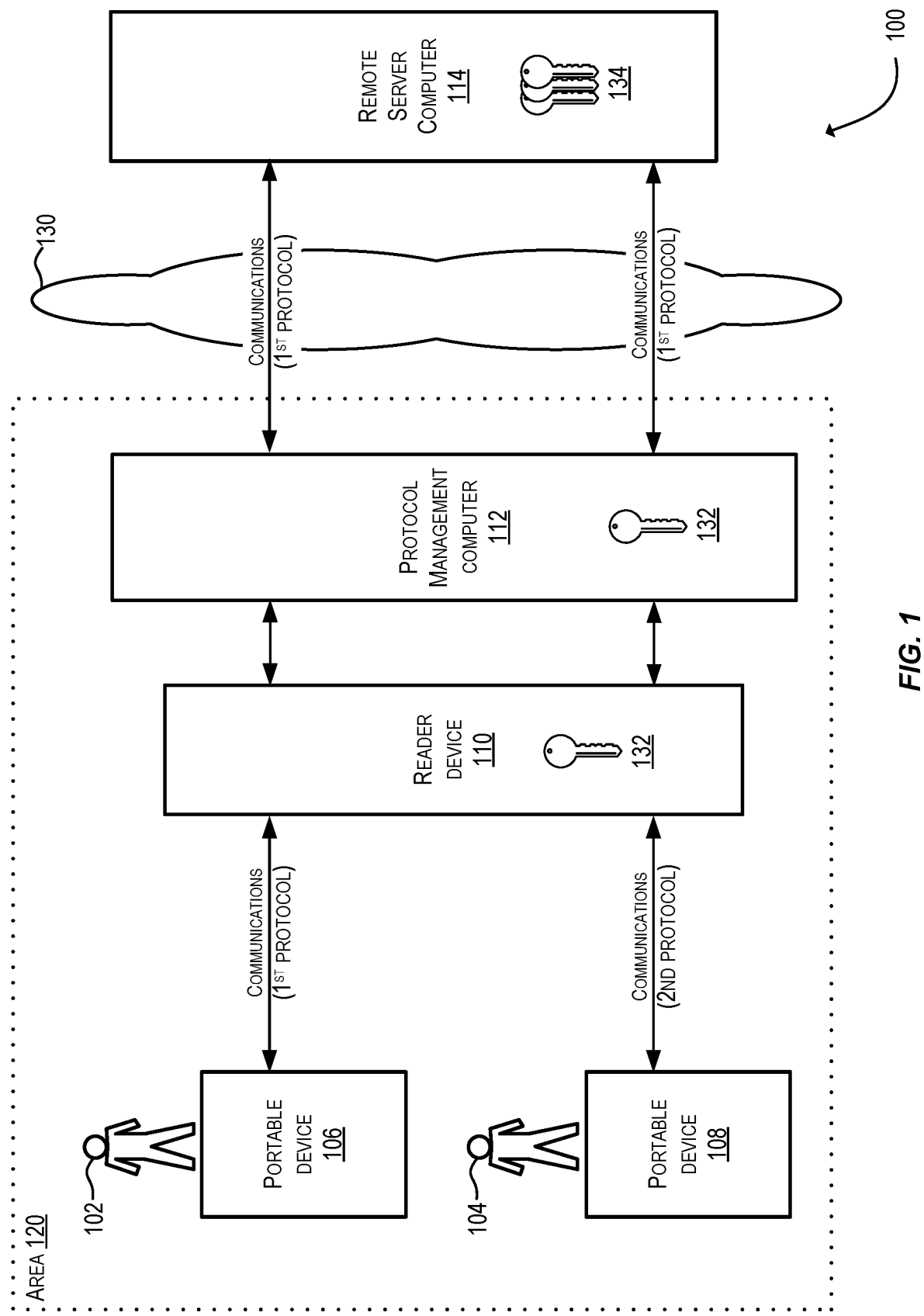
FIG. 1 shows a block diagram of a system for exchanging data between devices using different communication protocols, in accordance with some embodiments.

Embodiments can include methods and systems that can facilitate a secure key exchange between two devices. By way of example, a thin client (TC) (e.g., an access device) may be disposed between a reader device (e.g., a card reader) and an acceptance cloud (e.g., a cloud-based server) that may be configured to perform terminal processing (e.g., point of sale terminal processing, credit/debit card terminal processing). The acceptance cloud (referred to as the "Kernel in the Cloud" (KiC)) may communicate utilizing a first protocol (e.g., EMV® first generation protocol). The thin client may further be configured to communicate, via a reader device, with a portable device (e.g., a payment device) that may be configured to communicate utilizing a same (e.g., EMV® first generation protocol) or different protocol (e.g., EMV® second generation protocol). The reader device may communicate with the thin client via a communications protocol (e.g., Bluetooth Low Energy® (BLE)) to exchange transaction data between a portable device and the KiC.

To establish a secure communication between the TC and the reader device over BLE, an Elliptic-curve Diffie-Hellman (ECDH) key agreement scheme (0 static, 2 ephemeral ECDH with authentication keys) may be used (e.g., based on National Institute of Standards and Technology's Special Publication, SP800-56A, Revision 3) to derive symmetric shared secret keys for payload encryption and MAC generation. However, the public key of the reader device and the TC needs to be to be shared securely prior to executing the key agreement scheme.

Utilizing the techniques disclosed herein, an initialization key is provided to the TC and the reader device in advance of performing an ECDH key agreement scheme. In some embodiments, the initialization key may be stored at the reader device during a manufacturing (or initialization) process of the reader device prior to being obtained by the eventual user. The same initialization key may be provided to the TC (e.g., by the acceptance cloud) by request. The initialization key can be utilized by the TC and the reader device to exchange public keys in a secure manner such that the public keys cannot be intercepted and/or obtained by an unauthorized party. The protocol defined below in connection with FIG. 2 (and similarly in FIG. 3) enables the TC and reader device to encrypt these public keys and verify authenticity and validity of the message. These techniques provide an advantage over conventional systems that utilize a certification authority to provide certificates that include the other device's public key. The TC and reader device in the examples provided have no need to store certificates or the public key of a certification authority. Thus, the techniques provided herein reduce the amount of data stored. Additionally, utilizing the protocol and initialization key as discussed herein frees the system form the burden of utilizing a certificate authority to obtain certificates in the first place.

A number of aspects related to providing secure communication between a Thin Client (TC) and a reader device are discussed herein. Some of these aspects relate to establishing trust between the TC and the reader device, performing mutual authentication, and securing communications between the TC and the reader device.

Prior to discussing embodiments of the invention, some terms will be described.

A "portable device" may comprise any suitable device that may be carried by a user. Examples of portable devices may include mobile communication devices (e.g., mobile phones), payment devices (e.g., credit cards, debit cards, etc.), user access devices such as access badges, etc. A portable device can store sensitive information such as payment credentials (e.g., primary account numbers, tokens, expiration dates, etc.), and access credentials. A portable device may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction). Mobile communication devices may also include vehicles such as cars that have remote communication capabilities.

A "reader device" refers to a data input device that reads data from a card (e.g., a smart card, a magnetic stripe card, etc.), a mobile communication device, or any suitable storage medium.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc. For example, a payment token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

An "acceptance cloud" may be a cloud-based system that performs point-of-sale terminal processing for payment acceptance. An server computer of the acceptance cloud may be used for communicating with a merchant computer, a transaction processing computer, an authentication computer, or any other suitable system. The server computer (also referred to as a remote server computer) may be located in a remote location with respect to a location at which a reader device and/or a protocol management computer/thin client device is located.

A "protocol management computer" may be any suitable device that provides protocol management functionality of message ultimately exchanged between an acceptance cloud and a portable device. A protocol management computer may include a reader device and/or a protocol management computer may be communicatively connected to a reader device. A protocol management computer may be a thin client device.

A "thin client device" may be any suitable device that has been configured to establish a connection with a server-based computing environment (e.g., a cloud server). In some embodiments, a thin client may execute software and/or applications that provide a limited set of operations and/or functionality.

A "reader device" may include any suitable device for reading data (e.g., from a portable device. An reader device may use any suitable contact or contactless mode of operation to send or receive data from, or associated with, a mobile communications device or portable device. For example, exemplary reader devices can include radio frequency (RF) antennas, optical scanners, bar code readers, or magnetic stripe readers to interact with a payment device and/or mobile device. In some embodiments, a reader device may be a device that is separate from the access device and may be configured to communicate with the access device via on or more wireless communications protocols (e.g., Bluetooth Low Energy® (BLE), Bluetooth®, Near Field Communications (NFC), etc.).

A "shared secret" (also referred to as a "symmetric key") is a piece of data shared by two parties. A shared secret may be a symmetric key of a symmetric cryptosystem. The shared secret can be a password, passphrase, alphanumeric code, or any suitable token. A shared secret can be utilized to encrypt and decrypt data exchanged between the two parties.

An "initialization key" refers to a shared secret that may be utilized to secure (e.g., encrypt) communications utilized for an initialization procedure.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of a system including users 102 and 104, portable devices 106 and 108, a reader device 110, a protocol management computer 112 (e.g., an example of an access device), a remote server computer 114 (e.g., a server computer that is remote with respect to area 120), and a communication network 130. The users 102 and 104, the portable devices 106 and 108, the reader device 110, and the protocol management computer 112 are depicted to be located within an area 120. The portable device 106 and the remote server computer 114 may be configured to communicate using a first protocol (e.g., EMV® first generation protocol) while portable device 108 may be configured to communicate using a second communication protocol (e.g., EMV® second generation protocol). In some embodiments, the remote server computer 114 may be configured as an acceptance cloud (e.g., a cloud-based server) that can perform terminal processing for payment transaction.

The portable devices 106 and 108 exchange communications with the reader device 110 (e.g., a card reader), which in turn exchanges communications with the protocol management computer 112 (e.g., a thin client), which in turn exchanges communications (e.g., via EMV® first generation protocol) with the remote server computer 114 (e.g., an acceptance cloud) over the communication network 130. In particular, the reader device 110 may be utilized to communicate with the portable devices 106 and 108 and to pass data between the portable devices 106-108 and the protocol management computer 112. The protocol management computer 112 (e.g., the thin client) is configured to serve as an interpreting relay that enables a portable device (e.g., the portable device 106 or the portable device 108) to exchange transaction information with the remote server computer 114 during a transaction.

Prior to data exchange, the reader device 110 and the protocol management computer 112 are configured to perform operations to securely exchange public keys. In some embodiments, to enable the secure exchange of public keys, the reader device 110 and the protocol management computer 112 are configured with a shared secret (e.g., initialization key 132). In some embodiments, the reader device 110 is configured (e.g., by its manufacturer) to store initialization key 132 during a process for manufacturing reader device 110. The manufacturer (not depicted) may communicate the initialization key 132 at any suitable time (e.g., via a user interface, an electronic message, an application programming interface, or the like) to an acceptance cloud (e.g., the remote server computer 114) where it is stored (e.g., as part of shared keys 134) and associated with an identifier of the reader device 110 (e.g., a serial number, a manufacturer identifier, any suitable alphanumeric code, etc.). The protocol management computer 112 is configured to request the shared secret (e.g., initialization key 132) from remote server computer 114. Once the shared secret is known to both the reader device 110 and the protocol management computer 112, the devices may exchange public keys by encrypting their respective public keys with the shared secret (e.g., the initialization key). Example protocols for securely performing public key exchange is discussed in further detail with respect to FIGS. 2 and 3. A secure communication between the TC and the reader device can be established over BLE using an Elliptic-curve Diffie-Hellman (ECDH) key agreement scheme. An example protocol for establishing a secure channel between two devices is discussed in further detail with respect to FIG. 4. Once configured for secure communication, the reader device 110 and the protocol management computer 112 may be utilized to enable secure data exchange between the portable devices 106-108 and the remote server computer 114.

By way of example, the users 102 and 104 may be customers that are attempting to buy an item at a brick-and-mortar store (e.g., area 120). The portable device 106 is a newer type of credit card that is being carried by the user 102, the portable device 108 is an older type of credit card that is being carried by the user 104, the reader device 110 is a card reading device that is located in the store building, the protocol management computer 112 can be a terminal and/or a portable device operated by the store (e.g., the merchant's cell phone), and the remote server computer 114 is a remotely located server computer that provides cloud-based terminal processing for payment transactions over the communications network 130 (e.g., the Internet). In some embodiments, the functionality of the protocol management computer 112 is part of an application that is installed on a merchant's user device (e.g., a smartphone, laptop, desktop computer, tablet, or any suitable device operated by a user).

In one example, the user 102 uses the portable device 106 to conduct a transaction. In some embodiments, the portable device 106 may be inserted in, swiped through, and/or held near (e.g., tapped against) the reader device 110. In some embodiments, the reader device 110 can communicate in a first communication protocol. When a transaction is initiated between the portable device 106 and the protocol management computer 112 via the reader device 110, the portable device 106 and the remote server computer 114 attempt to exchange transaction information. In some embodiments, the remote server computer 114 may seek to obtain payment account details from the portable device 106 while the portable device 106 may seek to obtain transaction data (e.g., terminal transaction parameters, language preference, transaction currency code, etc.) from the remote server computer 114. To free the remote server computer 114 from having to execute other communication protocols other than the first communication protocol, the protocol management computer 112 serves as a communication conversion or abstraction module, where the protocol management computer 112 intercepts, screens, converts, and/or filters communications between the remote server computer 114 and any portable device (e.g., the portable device 106) that is attempting to perform a transaction with the remote server computer 114.

Communication protocols between the protocol management computer 112 and the portable device 106 (via the reader device 110) may depend on their respective capabilities (e.g., what protocol do they have in common, e.g. contact, contactless, NFC, Bluetooth, Wi-Fi, QR code, etc.) The protocol management computer 112 serves as a communication conversion or abstraction module that shields the remote server computer 114 from supporting multiple communication protocols, where there is one conversion/abstraction module for each type of portable device 106-108.

In particular, the protocol management computer 112 can communicate using different communication protocols (e.g., both the first communication protocol and the second communication protocol). When receiving, from a portable device via the reader device 110, communications under a communication protocol that is incompatible with the remote server computer 114 (e.g., the second communication protocol), the protocol management computer 112 converts the received communications to be compatible with the remote server computer 114 (e.g., to adhere to the first communication protocol) and forwards the converted communications. Likewise, when receiving communications from the remote server computer 114, the protocol management computer 112 converts the communications to the communication protocol that is incompatible with the remote server computer 114 before forwarding the converted communication to the portable device via the reader device 110.

In some embodiments, the user 104 initiates a contact transaction by inserting the portable device 108 into the reader device 110 so that communications under the second communication protocol may be exchanged between the portable device 106 and the protocol management computer 112 via the reader device 110. As communications under the second communication protocol are exchanged between the portable device 108 and the protocol management computer 112 via the reader device 110, the protocol management computer 112 converts communications received from the portable device 108 to the first communication protocol and transmits the converted communications to the remote server computer 114. The remote server computer 114 may generate responses to the converted communications and sends those responses in the form of communications under the first communication protocol to the protocol management computer 112. In response, the protocol management computer 112 may convert communications received from the remote server computer 114 to the second communication protocol and transmit the converted communications to the portable device 108 via the reader device 110.

At a different point in time, the user 102 may initiate a contactless transaction by holding the portable device 106 close to the reader device 110 (or the protocol management computer 112) so that communications under the first communication protocol may be exchanged between the portable device 106 and protocol management computer 112. In some embodiments, the reader device 110 transmits the data obtained from portable device 106 to the protocol management computer 112 over a wired or wireless communications channel (e.g., Bluetooth®). In this instance, the protocol management computer 112 determines that the portable device 106 and the remote server computer 114 use compatible communication protocols (e.g., both use the same communication protocol). Thus, as communications under the first communication protocol are exchanged between the portable device 106 and the protocol management computer 112 (via the reader device 110), the protocol management computer 112 forwards communications received from the portable device 106 to the remote server computer 114 without performing a conversion. Likewise, when communications are received from the remote server computer 114, the protocol management computer 112 forwards the communications to the portable device 106 via the reader device 110 without performing a conversion.

In some embodiments, the first communication protocol discussed above may correspond to the Europay Master Visa (EMV) second generation standard (EMV 2.0) while the second communication protocol may correspond to the EMV first generation standard (EMV 1.0). Each EMV standard is associated with a number of payment schemes. Each payment scheme in EMV 1.0 defines its own payment processing module, where each module includes functions, logic, or data used for handling contact or contactless transactions performed using the associated payment scheme. In processing a transaction, a POS terminal (in this case, the remote server computer 114) would need to identify which payment processing module is to be used and then let that module take over the exchange of commands with the portable device (where the commands are sent via the exchanged communications and the commands include data). EMV 1.0 may be a stateful communication protocol. Stated another way, EMV 1.0 payment processing modules may expect commands to be exchanged in a particular sequence.

EMV 2.0 may be a stateless data driven communication protocol that may be associated with a single processing module that can handle different schemes. In general however, a POS terminal that is configured to handle EMV 2.0 transactions may be unable to handle EMV 1.0 transactions. Rather than have a merchant operate a first POS terminal for EMV 1.0 transactions and a second POS terminal for EMV 2.0 transactions, some embodiments may allow the merchant to operate a single physical card reader (i.e., the protocol management computer 112) that is capable of handling any payment scheme associated with the EMV 1.0 communication protocol or the EMV 2.0 communication protocol. The card reader may be communicatively coupled to a PA in the cloud (i.e., the remote server computer 114) that handles payment processing over a single communication protocol (e.g., the first communication protocol).

Thus, in response to the initiation of a transaction by a credit/debit card, the reader device 110 and/or the protocol management computer 112 may be responsible for identifying the communication protocol (e.g., EMV 1.0 or EMV 2.0), the payment scheme, and/or the payment processing module to use based on the credit card. If the identified communication protocol, payment scheme, or processing module is not compatible the communication protocol utilized by the remote server computer 114), the protocol management computer 112 translates or converts communications from the portable device into a format that is compatible with the communication protocol utilized by the remote server computer 114. Meanwhile, the remote server computer 114 is responsible for processing the payment based on the converted/translated communications. Herein, the protocol management computer 112 may be referred to as "a thin client" or "thin client device". The resulting separation of concerns results in a plurality of modularized components (e.g., the thin client and the acceptance cloud of which the remote server computer 114 is a part) comprising software that is, as a whole, less complex than that of a single component (e.g., a single local POS terminal, where a local POS terminal is a complete payment acceptance system that is fully contained within a brick-and-mortar store) that is configured to process transactions using any communication protocol.

In some embodiments, EMV 2.0 is based on REST or JSON. For example, communications adhering to EMV 2.0 are formatted in XML or JSON and such communications may be transmitted and/or received from a REST interface.

In general, updates to payment processing logic are more common than updates to communication protocols. Accordingly, relocating the payment processing software from local POS terminals to an acceptance cloud (e.g., of which remote server computer 114 is a part) makes it easier to update payment processing logic, because the payment processing network operator would no longer need to update local POS terminals (e.g., by physically accessing card readers to perform any updates).

The area 120 is intended to correspond to a physical location of a resource provider (e.g., a brick-and-mortar store) where the portable devices 106-108 are placed in close proximity to (e.g., a few inches or feet from) the reader device 110 and/or the protocol management computer 112 to perform transactions. However, the setup depicted in FIG. 1 is not intended to be limiting. In other embodiments, for example, the portable devices 106-108 may be located remotely from the protocol management computer 112.

The protocol management computer 112 is intended to depict one or more access devices located at the resource provider location. For example, the protocol management computer 112 may include a reader device (e.g., the reader device 110 or a different reader device) used for extracting transaction information from credit cards or debit cards used by customers at a store. In some embodiments, the protocol management computer 112 is a thin client device that is connected to the remote server computer 114 through the Internet (i.e., the communication network 130) via a Wi-Fi connection or an Ethernet connection). In general, the protocol management computer 112 provides a unified transaction interface that enables the remote server computer 114 to conduct transactions with a wider variety of portable devices. In comparison to local payment acceptance systems, some embodiments may separate payment acceptance functionality between two or three physically-decoupled devices: the protocol management computer 112 and the remote server computer 114 or the reader device 110, the protocol management computer 112, and the remote server computer 114. In particular, the protocol management computer 112 includes logic for communicating with portable devices over various communication protocols, managing state and/or flow (e.g., for stateful communication protocols), and converting communications from one protocol to another. It should be noted that the state or flow of a stateful communication protocol affects how information is communicated using the stateful communication protocol. In particular, the state or flow of a stateful communication protocol can specify the number of commands to be sent, the sequence of the commands, and what data is carried in which commands. The protocol management computer 112 is discussed in further detail below with respect to FIG. 7.

The remote server computer 114, which can correspond to a cloud based system or one or more server computer systems that are remotely located with respect to area 120, includes logic for conducting transactions (e.g., payment processing logic) with portable devices. In some embodiments, the remote server computer 114 hosts a payment processing module that is referred to as the "payment acceptance (PA) in the cloud." In particular, the PA in the cloud may be a unified payment processing module capable of handling transactions performed using one or more payment schemes under EMV 2.0.

The portable devices 106-108 may each be a portable device as defined above, where the portable device 106 is configured to perform transactions using the first communication protocol while the portable device 108 is configured to perform transactions using the second communication protocol. For example, the portable device 106 may be a newer type of credit card or debit card that is compatible with EMV 2.0 while the portable device 108 may be an older type of credit card or debit card that is compatible with EMV 1.0.

The protocol management computer 112 and the remote server computer 114 are communicatively coupled to the communication network 130. The communication network 130 can be of any type and can include one or more communication networks. Examples of the communication network 130 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network 130 may include any communication network or infrastructure that facilitates communications between computing devices.

The protocol management computer 112 and the reader device 110 are communicatively coupled to one another via the same or a different network with area 120 such as the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols.

Figure 2:
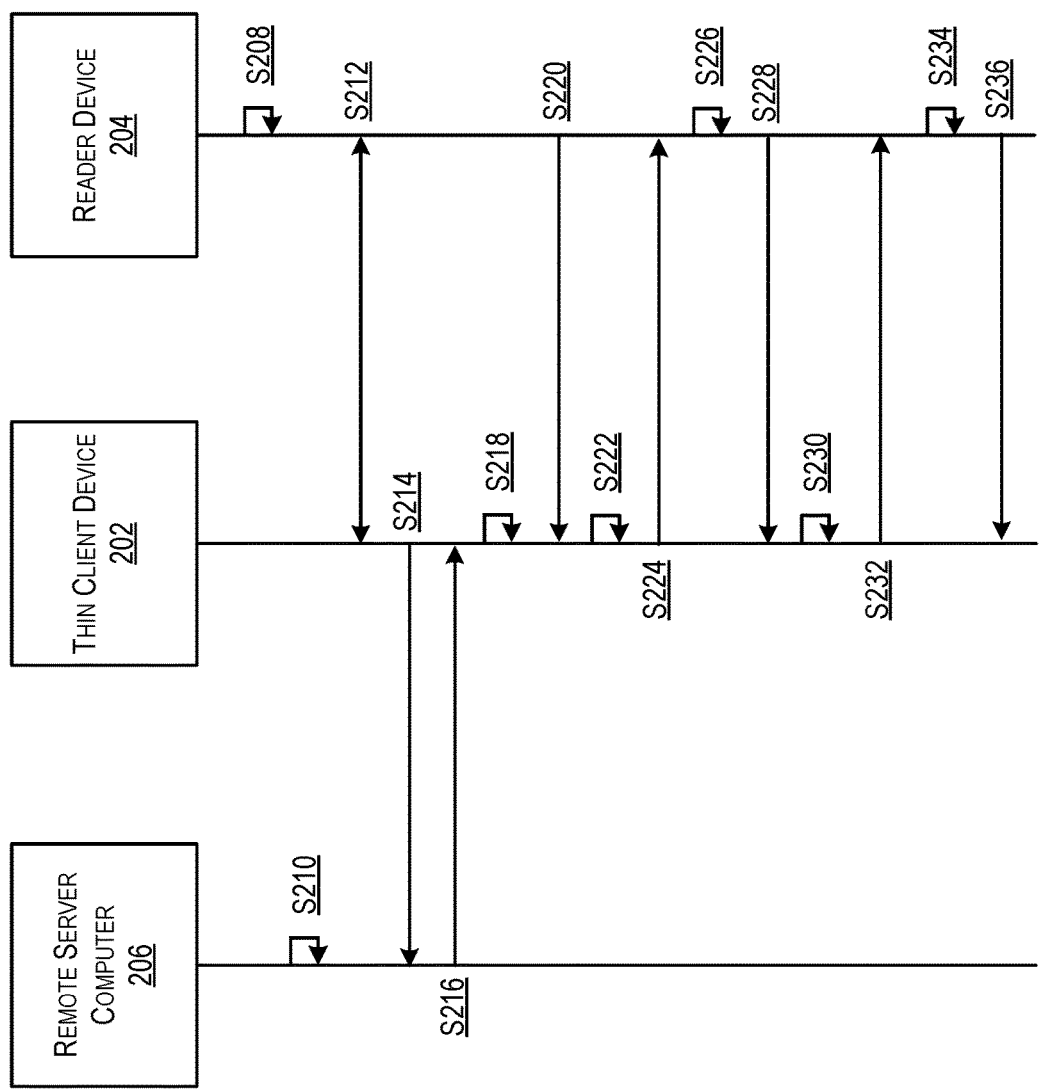
FIG. 2 shows a flow diagram of a protocol for securely exchanging public keys between a thin client and a reader device, in accordance with some embodiments.

FIG. 2 shows a flow diagram of a protocol 200 for securely exchanging public keys between a thin client device 202 (an example of the protocol management computer 112 of FIG. 1) and a reader device 204 (an example of the reader device 110 of FIG. 1), in accordance with some embodiments. The following steps may be performed in any suitable order. In some embodiments, more or fewer steps may be included in the following protocol. The following steps may be performed via near-field communications. In some embodiments, the thin client device 202 operates as a contactless payment card (tap to pay card) and communicates with the reader device 204 via application protocol data unit (APDU) communications (e.g., APDU commands and/or responses defined by ISO/IEC 7816-4).

In some embodiments, the thin client device 202 and reader device 204 store security assets securely and provide adequate protections to prevent disclosure of data-in-rest. Each of the devices further support cryptographic algorithms and parameters (e.g., ECC P-256, Random number generation, AES-GCM, SHA-256, ECDH, HMAC, ECDSA, and the like). In some embodiments, the reader device 204 is enrolled and initialized as a trusted device to use cloud-based acceptance services by interacting with a KiC, or by a manufacturer of the reader device interacting with the KiC discussed herein of which remote server computer 206 is an example. In some embodiments, the thin client device 202 and reader device 204 communicate using a wireless protocol such as Bluetooth Low Energy® (BLE) and/or near-field communication (e.g., utilizing a near-field communication protocol for communication between two electronic devices over a distance of approximately 4 cm or less). In some embodiments, the manufacturing, setup, and initialization of the reader device 204 can take place in a secure environment. In some embodiments, the thin client device 202 and reader device 204 are configured with a predetermined ECC domain parameter and both devices can be configured to perform ECC key generation techniques.

At S208, during the manufacturing process, several parameters are securely stored on or generated by the reader device 204 to be used in initialization and key agreement phases. For example, a 128-bit AES-GCM key, K_init may be securely stored on the reader device 204. This initialization key may be utilized to provide confidentiality and integrity while exchanging security assets during an initialization procedure performed by the two devices. In some cases, the reader device 204 generates a static elliptic-curve cryptography (ECC) key pair ($SS_{R\_Auth}$, $SP_{R\_Auth}$), which can be used during key negotiation phase for authentication. A unique identifier, KiC_Reader_ID may be generated by the reader. This unique identifier is associated with the generated authentication key pair ($SS_{R\_Auth}$, $SP_{R\_Auth}$). The following table illustrate some of the data generated, stored, and exchanged between the thin client device 202 and the reader device 204 during the manufacturing process (or at least prior to an initialization procedure discussed below beginning at S220).

|  | Thin Client Device | Reader Device |
|---|---|---|
| Generates | N/A | ECC P-256 key pair ($SS_{R\_Auth}$, $SP_{R\_Auth}$) 16-byte unique Identifier KiC_Reader_ID |
| Stores | 128-bit AES-GCM Secret Key: K-init | Private key: $SS_{R\_Auth}$ 128-bit AES-GCM Secret Key: K-init |

At S210, the key K_init is provided (e.g., by the manufacturer of the reader device 204) to the KiC (e.g., the remote server computer 206). K_init may be provided to the KiC via any suitable electronic message, communication, user interface (e.g., an interface provided by the KiC), or application programming interface (API) (e.g., an API hosted by the remote server computer 206).

At S212, the thin client device 202 detects the reader device 204. For example, the thin client device 202 may be configured to periodically transmit a request for a device identifier. In some embodiments, the reader device 204 transmits its device identifier (e.g., an alphanumeric identifier, a serial number, etc.), periodically, and/or in response to receiving a request for a device identifier. In some embodiments, the reader device 204 detects the thin client device 202 based at least in part on receiving a message (e.g., a message indicating a request for a device identifier) from the thin client device 202. In some embodiments, the reader device 204 transmits its device identifier to the thin client device 202 in response to receiving the message (e.g., the message indicating the request for a device identifier). In some embodiments, the thin client device 202 detects the reader device 204 based at least in part on receiving a message (e.g., a message including the device identifier of the reader device 204) from the reader device 204.

At S214, in response to detecting the reader device 204, the thin client device 202 transmits a request for a shared secret (e.g., a shared secret associated with the reader device 204 such as the shared secret provided to the remote server computer 206 at S210). In some embodiments, the request includes the device identifier of the reader device 204 obtained during the detection step at S212.

At S216, the remote server computer 206 transmits the shared secret associated with reader device 204. The shared secret need not be associated with the reader device 204 in particular, rather, in some cases the shared secret may be associated with the manufacturer of the reader device 204. Thus, in some cases, all reader devices manufacturer by a given manufacturer may share the same shared secret.

At S218, upon receiving the shared secret or at any suitable time, the thin client device 202 stores the shared secret (K_init) in local memory.

In some embodiments, an initialization procedure may be performed with the thin client device 202 and reader device 204. During the initialization procedure, the thin client device 202 and reader device 204 exchange security assets (e.g., corresponding public keys) that are encrypted using the secret key K_init obtained at S208 and S210, respectively. During the initialization phase, thin client device 202 may operate in the particular operational mode (e.g., a "tap-in-play" mode) and may communicate with the reader device 204 via a communications interface (e.g., using an ISO 7816 interface). An applet (e.g., referred to as a VTRT applet) is initialized on the thin client device 202 and used to exchange Application Protocol Data Unit (APDU) commands and responses with the reader device 204.

The initialization procedure may begin at S220, where the reader device 204 selects an application identifier (AID) of a VTRT applet and transmits a message (e.g., a SELECT AID command to the thin client device 202 (e.g., via an APDU select command or response). In some embodiments, this selection may be in response to receiving from and/or transmitting to one or more APDU commands and/or responses with the thin client device 202.

In some embodiments, a SELECT AID command is utilized based on the following format:

| CLA | INS | P1 | P2 | Lc | Command Data | Le |
|---|---|---|---|---|---|---|
| 0x00 | 0xA4 | 0x04 | 0x00 | 0x0B | VTRT AID | 00 |

At S222, the thin client device 202 generates a unique identifier (e.g., a 16-byte unique identifier referred to as "TC_Reader_Init_ID"), a random nonce (e.g., a 16-byte random nonce referred to as "Nonce_TC"), and an initialization vector (e.g., a 12-byte initialization vector (IV) referred to as a "IV1"). Nonce_TC and IV1 may be generated by thin client device 202 based on the requirements specified in NIST SP 800-56A Revision 3, Recommendation for Pair-Wise Key Establishment Schemes Using Discrete Logarithm Cryptography, Revision 3 Apr. 2018 (SP800-56Ar3). The thin client device 202 responds to the message received at S220 (e.g., an APDU select command) with an encrypted value. The encrypted value may be generated using any suitable encryption algorithm (e.g., Authentication Encryption Standard with Galois/Counter Mode (AES_GCM), or any suitable encryption algorithm). In some embodiments, the encryption algorithm takes as input a shared secret (e.g., K_init), and a concatenated value comprising TC_Reader_Init_ID and Nonce_TC).

At S224, the encrypted value is concatenated with IV1 and the concatenated value is transmitted to the reader device 204 (e.g., in an APDU response such as a SELECT AID command response) with a data field "status word" set to the value 9000. The status word 9000 is used to indicate that the message is provided as part of an initialization procedure. Thus, the APDU response transmitted at S224 may include AES_GCM (K_init, TC_Reader_Init_ID∥Nonce_TC)∥IV1 and status word 9000.

In some embodiments, a response to a SELECT AID response is utilized based on the following format:

| Response Data | Trailer data |
|---|---|
| May include initial data settings as a response of FCI (e.g., using tag '6F'). In addition, tag BF0C may be utilized to return AES_GCM ( K_init, TC_Reader_Init_ID ∥ Nonce_TC) ∥ IV. | SW1SW2 |

Returned trailer data can include any suitable values such as:
  0x9000: indicating the application was selected successfully
  0x6A81: indicating that the command is not supported a card is blocked
  0x6A82: file is not found
  0x6283: indicating the application is blocked At S226, the reader device 204 receives the APDU message (e.g., SELECT AID command response) and decrypts it using IV1 obtained from the message. The reader device 204 generates an encrypted value using AES_GCM or any suitable encryption algorithm. For example, the encrypted value may be generated by providing K_init, a concatenation of $SP_{R\_Auth}$, KiC_Reader_ID, and Nonce_TC, and a Bluetooth identifier (e.g., a BLE name) associated with the reader device 204 (referred to as BLE_Name_Reader) as input to the encryption algorithm (notated by AES_GCM (K_init, $SP_{R\_Auth}$∥KiC_Reader_ID∥Nonce_TC, BLE_Name_Reader)). BLE_Name_Reader indicates a name associated with the reader device 204 that may be used for a BLE communication protocol. The BLE_Name_Reader may be integrity protected as Additional Authenticated Data (AAD) field in AES_GCM. The encrypted value is concatenated with BLE_Name_Reader. The reader device 204 generates another initialization vector (referred to as "IV2") and use IV2 to encrypt a message (e.g., a SET DATA command) including the encrypted value. In some embodiments, IV2 may be generated by providing IV1 to a hashing algorithm (e.g., SHA-256, SHA 512, etc.) as input and obtaining the left most 12 bytes of the resultant hash value. Thus, IV2 may equal SHA-256(IV1).

At S228, the reader device 204 transmits the message (e.g., the SET DATA command) to the thin client device 202. In some embodiments, a SET DATA command is utilized based on the following format:

| CLA | INS | P1 | P2 | Lc | Command Data | Le |
|---|---|---|---|---|---|---|
| 0x80 | 0xEA | 0x00 | 0x00 | 0x64 | Tag '5F' with length 0x0640 00 may include 64 byte encrypted data following with tag '8F' with maximum length 0x20 that contains 32 bytes BLE_Name_Reader. An example of such data can include AES_GCM (K_init, $SP_{R\_Auth}$ ∥ KiC_Reader_ID ∥ Nonce_TC, BLE_Name_Reader) ∥ BLE_Name_Reader). BLE_Name_Reader may be sent as Additional Authentication Data (AAD) of AES_GCM, which may be a maximum of 32 bytes. | |

At S230, the thin client device 202 receives the APDU message (the SET DATA command) and decrypts it using IV2 (e.g., generated by the thin client device 202 by SHA-256(IV1)). Thin client device 202 verifies the Nonce_TC from the message by comparing the Nonce_TC received at S230 to the Nonce_TC generated at S222. If the Nonce_TCs do not match, the thin client device 202 may discard the message and processing may cease. If the Nonce_TCs match, the thin client device 202 may consider the message verified and generates an ECC P-256 key pair (e.g., a private and public key pair individually referred to as "$SS_{TC\_Auth}$" and "$SP_{TC\_Auth}$", respectively). The thin client device 202 generates a random seed (e.g., a 16-byte random seed referred to as "Seed_TC") and associates the one or both keys with any suitable combination of the KiC_Reader_ID, BLE_Name_Reader, and/or Seed_TC. In some embodiments, the thin client device 202 validates $SP_{R\_Auth}$, the public key of the reader device 204, based on section 5.6.2.2.3 of SP800-56Ar3. The thin client device 202 generates an encrypted value using any suitable encryption algorithm (e.g., AES_GCM) using K_init, a concatenation of $SP_{TC\_Auth}$, Seed_TC, and a hashed value generated with a hashing algorithm (e.g., SHA-256) a concatenation of KiC_Reader_UD and TC_Reader_Init_ID, and status 9000. In some embodiments, the encrypted value is denoted by AES_GCM (K_init, $SP_{TC\_Auth}$, ∥Seed_TC∥SHA-256 (KiC_Reader_ID∥ TC_Reader_Init_ID)). The thin client device 202 generates another initialization vector (referred to as "IV3") and use IV3 to encrypt a message (e.g., a SET DATA response) including the encrypted value and status word 9000. In some embodiments, IV3 is generated by providing IV2 to a hashing algorithm (e.g., SHA-256, SHA 512, etc.)

as input and obtaining the left most 12 bytes of the resultant hash value. Thus, IV3 may equal SHA-256(IV2).

At S232, the thin client device 202 transmits the message (e.g., the SET DATA command response) to the reader device 204. The SET DATA command response may be utilized according to the following format:

| Response Data | Trailer data |
|---|---|
| Response data may include encrypted data (e.g., K_init, $SP_{TC\_Auth}$, || Seed_TC || SHA-256 (KiC_Reader_ID || TC_Reader_Init_ID)). In some embodiments, the response data may utilize tag '7F'. In case of any error, the applet may not return any data other than, for example, an error code. | SW1SW2 |

Response data may include trailer data such as:
  0x9000: indicating the Set Data command is successful.
  0x6980: indicating an incorrect data length. This error message may be returned when the expected number of bytes are not received.
  0x6981: indicating the TC does not recognize the reader. This can occur when the returned Nonce_TC could not be verified by the TC.
  0x6982: indicating that AES-GCM authentication failed.
  0x6983: indicating that data could not be decrypted correctly.
  0x6984: indicating any suitable error not listed above.

At S234, the reader device 204 decrypts the received message (e.g., the SET DATA command response) using IV3 (e.g., generated by the reader device by SHA-256 (1V2)). The reader device 204 verifies the message based at least in part on independently computing a hashed value using a hashing algorithm (e.g., SHA-256) and a concatenation of KiC_Reader_ID and TC_Reader_Init_ID (KiC_Reader_ID||TC_Reader_Init_ID) as input. The resultant hash value is compared to the hash of KiC_Reader_ID||TC_Reader_Init_ID as obtained from the received message. If the hash values match, the message may be considered verified. Else, the reader device 204 may discard the message and processing ceases. If the message has been verified, the reader device 204 stores the public key of the thin client device 202 and the Seed_TC obtained from the message. In some embodiments, the reader device 204 may store an association between the public key of the thin client device 202 ($SP_{TC\_Auth}$) and Seed_TC obtained from the message with TC_Reader_Init_ID.

At S234, if the message received at S234 is verified, the reader device 204 transmits an APDU message (e.g., a SESSION READY command) indicating the receipt of message transmitted at S232 was successful.

In some embodiments, a SESSION READY command is provided in the following format

| CLA | INS | P1 | P2 | Lc | Command Data | Le |
|---|---|---|---|---|---|---|
| 0x80 | 0xEB | 0x00 | 0x00 | 0x02 | If the Set Data response was received and validated successfully, 0x0000 can be sent as data. Otherwise, the response data may be erroneous and the initialization phase may be restarted from step 1. 0xF001: Data authentication failed 0xF002: Data could not be decrypted | N/A |
| | | | | | 0xF003: Wrong data length 0xF004: Reader does not recognize the TC. 0xF005: Other types of error. | |

During the initialization phase, in case of any type of error such as invalid data, time out, tearing, operational failures, etc., the communication can be aborted. Different status words are defined for potential errors. In some embodiments, before operations cease, the device that identifies an error transmits an APDU message with a status word indicating the particular error to the other device.

Although not depicted, in some embodiments, the thin client device 202 sends the response to the Session Ready command as: 0x9000: indicating the session ready command was received successfully, 0x6985: indicating unexpected response data, or 0x9656: indicating another error.

If the thin client device 202 does not receive the SESSION READY command, the communication can be aborted. All the generated keys and nonce values are securely removed from the reader device 204 and the thin client device 202.

Although not depicted, in some embodiments, if the thin client device 202 has a power reset a RESET command may be sent to the reader device 204 specifying that new session keys are required to be negotiated.

The Power Reset command may be defined as: (for reader device 204 to thin client device 202) KiC_Reader_ID||PWRST as signed using ECDSA and $SS_{R\_Auth}$ or (for thin client device 202 to reader device 204) TC_Reader_Init_ID||PWRST as signed using ECDSA and $SS_{TC\_Auth}$. In some embodiments, if the signature was valid within the power reset command, the thin client device 202 and reader device 204 discard the current session keys and securely remove all the stored security assets.

Although not depicted, in some embodiments, a timer and transaction counter associated with the session keys are reset. These timers and transaction counters can be utilized as parameters that specify the session keys' life cycle. The session keys can be renegotiated after 'X' configurable transactions or seconds. In some embodiments, power reset commands have priority over any other operation. Thus, in some cases, receiving power reset by TC or reader may cause other operations to be interrupted and discarded.

Pairing reset refers to returning to initialization procedure (starting at S220), in which the reader device 204 and the thin client device 202 share their authentication public keys using the applet over NFC. In case of secure channel communication errors between the thin client device 202 and the reader device 204 that cannot be solved by power reset, such as failing to validate signatures, KC_MAC_TAG, Session_MAC_Tag, etc., the thin client device 202 and the reader device 204 may request pairing reset by sending a PAIRING RESET command. Upon pairing reset, the thin client device 202 and the reader device 204 return to the initialization procedure (starting at S220) in which the authentication public keys and other parameters are exchanged using the applet over NFC.

A PAIRING RESET command may be formatted as follows: (for reader device 204 to thin client device 202): KiC_Reader_ID||PRNGRST as signed using ECDSA and $SS_{R\_Auth}$ and (for thin client device 202 to reader device 204): TC_Reader_Init_ID∥ PRNGRST signed using ECDSA and $SS_{TC\_Auth}$. In some embodiments, if the signature was validated, the thin client device 202 and the reader device 204 securely erase all (or some portion) of the previously stored security assets.

In summary, the following table illustrate some of the data generated, stored, and exchanged between the thin client device 202 and the reader device 204 during the initialization procedure.

|  | Thin Client Device | Reader Device |
| --- | --- | --- |
| Generates | ECC 256 key pair ($SS_{TC\_Auth}$, $SP_{TC\_Auth}$)<br>16-byte random seed Seed_TC<br>16-byte nonce: TC_Nonce (for session validation)<br>16-byte unique identifier: TC_Reader_Init_ID<br>12-byte IV1 and IV3 | 12-byte IV2 |
| Stores | Reader's public key $SP_{R\_Auth}$<br>KiC_Reader_ID<br>BLE_Name_Reader | TC's public key: $SP_{TC\_Auth}$<br>Unique identifier: TC_Reader_Init_ID<br>Random seed Seed_TC |

In some embodiments, multiple reader devices are connected to a single thin client device using unique BLE names (e.g., BLE_Name_Reader corresponding to each reader device) and unique reader IDs (e.g., a KiC_Reader_ID corresponding to each reader device). A unique key pair ($SS_{TC\_Auth}$) associated with the BLE_Name_Reader and KiC_Reader_ID is generated for each initialized reader device. Session key negotiation may be established independently for each reader device over BLE using BLE_Name_Reader and unique parameters and authentication keys per the protocol 400 described below in connection with FIG. 4. Prior to session key negotiation, the thin client device and the reader device are paired to communicate over BLE. For a successful BLE pairing, the reader device may cast its BLE name (BLE_Name_reader) that was sent to the thin client device during the initialization procedure described above. The thin client device may search for the reader that is initialized using the BLE_Name_Reader. The thin client device can refuse connection to a reader that has not successfully initialized and may fail the BLE connection with an appropriate error message such as: "No Initialized Reader Found". In some embodiments, if the thin client device detects more than one initialized reader, it prompts a user (e.g., via an interface provided by the thin client device) to choose a reader (e.g., based on the BLE_Name_Reader).

Figure 3:
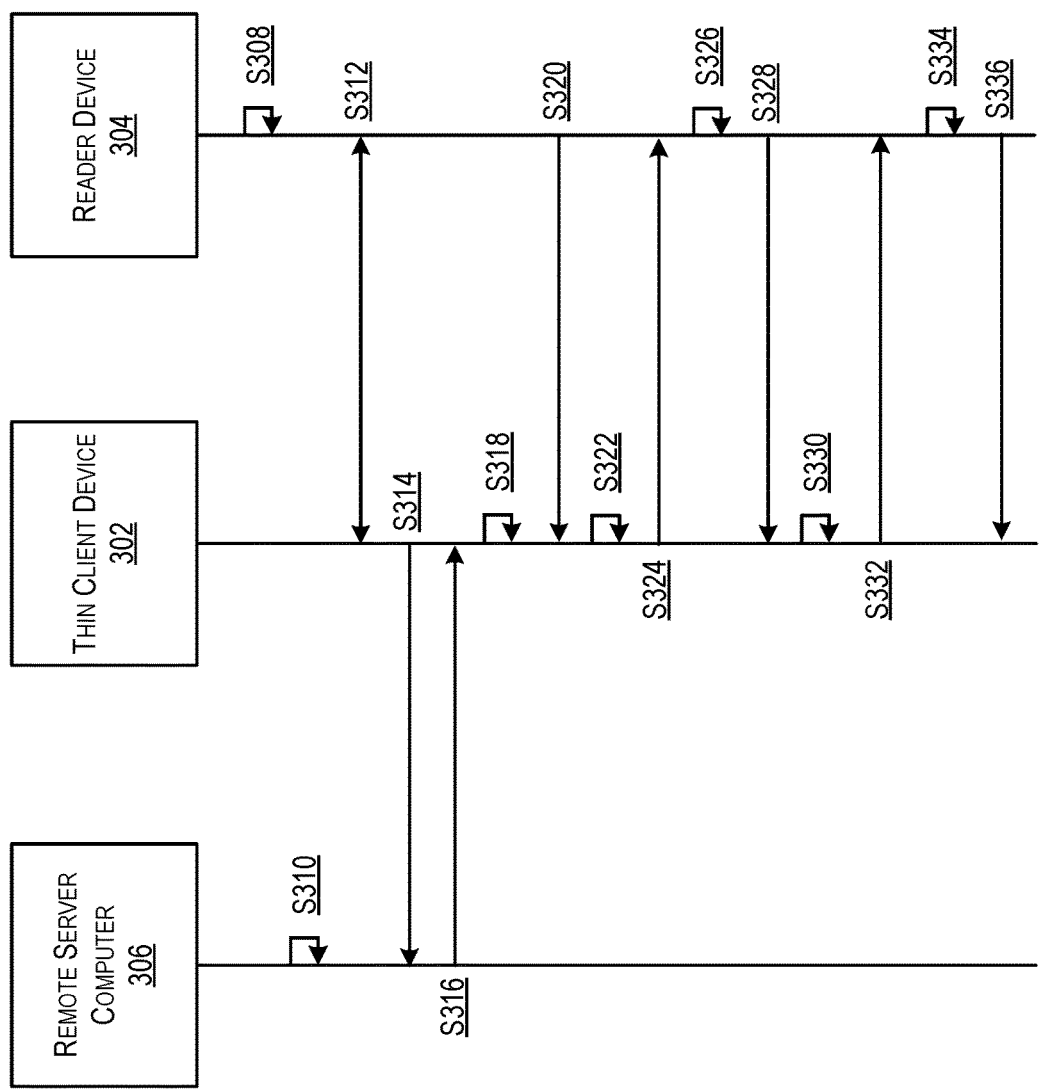
FIG. 3 shows a flow diagram of another protocol for securely exchanging public keys between a thin client device and a reader device, in accordance with some embodiments

FIG. 3 shows a flow diagram of another protocol 300 for securely exchanging public keys between a thin client device 300 (an example of the thin client device 202 of FIG. 2) and a reader device 304 (an example of the reader device 204 of FIG. 2), in accordance with some embodiments. The following steps may be performed in any suitable order. In some embodiments, more or fewer steps may be included in the following protocol. The following steps may be performed via near-field communications. In some embodiments, the thin client device 302 may operate as a contactless payment card (tap to pay card) and communicate with the reader device 304 via application protocol data unit (APDU) communications (e.g., APDU commands and/or responses defined by ISO/IEC 7816-4). Like thin client device 202 and reader device 204, thin client device 302 and reader device 304 may be configured to support cryptographic algorithms and parameters. The reader device 304 may be similarly enrolled and initialized as a trusted device in a similar manner as discussed in connection with FIG. 2.

In some embodiments, the thin client device 302 and reader device 304 store security assets securely and provide adequate protections to prevent disclosure of data-in-rest. Each of the devices further support cryptographic algorithms and parameters (e.g., ECC P-256, Random number generation, AES-GCM, SHA-256, ECDH, HMAC, ECDSA, and the like). In some embodiments, the reader device 304 is enrolled and initialized as a trusted device to use cloud-based acceptance services (e.g., via a manufacturer of the reader device interacting with a KiC discussed herein of which remote server computer 306 is an example). In some embodiments, the thin client device 302 and reader device 304 communicate using a wireless protocol such as Bluetooth Low Energy® (BLE) and/or near-field communication (e.g., utilizing a near-field communication protocol for communication between two electronic devices over a distance of approximately 4 cm or less). In some embodiments, the manufacturing, setup, and initialization of the reader device 304 can take place in a secure environment. In some embodiments, the thin client device 302 and reader device 304 are configured with a predetermined ECC domain parameter and both devices can be configured to perform ECC key generation techniques.

At S308, during the manufacturing process, a static elliptic-curve cryptography (ECC) key pair (e.g., a private/public key pair, referred to as an initialization key pair or $SS_{R\_Init}$, $SP_{R\_Init}$, respectively) may be generated (or obtained, for example by the manufacturer) and at least one key (e.g., $SS_{R\_Init}$) stored at the reader device 304. In some embodiments, the key pair may be static and utilized for each reader manufactured by the manufacturer. Additionally, the public key ($SP_{TC\_Init}$) of an ECC key pair ($SS_{TC\_Init}$, $SP_{TC\_Init}$) associated with the TC device 302 may be stored at the reader device 304. This initialization keys ($SS_{R\_Init}$, $SP_{R\_Init}$, $SS_{TC\_Init}$, $SP_{TC\_Init}$) may be utilized to provide confidentiality and integrity while exchanging security assets during an initialization procedure performed by the reader and thin client devices. In some cases, the reader device 304 may generate an additional static elliptic-curve cryptography (ECC) key pair ($SS_{R\_Auth}$, $SP_{R\_Auth}$), which can be used during key negotiation phase for authentication (discussed in more detail with respect to FIG. 4). A unique identifier, KiC_Reader_ID may be generated by the reader. This unique identifier is associated with the generated authentication key pair ($SS_{R\_Auth}$, $SP_{R\_Auth}$). The following table illustrate some of the data generated, stored, and exchanged between the thin client device 302 and the reader device 304 during the manufacturing process (or at least prior to an initialization procedure discussed below beginning at S320).

|  | Thin Client Device | Reader Device |
| --- | --- | --- |
| Generates | N/A | ECC P-256 key pair ($SS_{R\_Init}$, $SP_{R\_Init}$)<br>ECC P-256 key pair ($SS_{R\_Auth}$, $SP_{R\_Auth}$)<br>16-byte unique Identifier KiC_Reader_ID |
| Stores | Public key: $SP_{R\_Init}$<br>Private key: $SS_{TC\_Init}$ | Private key: $SS_{R\_Init}$<br>Public key: $SP_{TC\_Init}$<br>ECC P-256 key pair ($SS_{R\_Auth}$, $SP_{R\_Auth}$) |

At S310, $SP_{R\_Init}$ is provided (e.g., by the manufacturer of the reader device 304, by the reader device 304, etc.) to the KiC (e.g., the remote server computer 306). The $SP_{R\_Init}$ may be provided to the KiC via any suitable electronic message, communication, user interface (e.g., an interface provided by the KiC), or application programming interface (API) (e.g., an API hosted by the remote server computer 306).

At S312, the thin client device 302 exchanges data with the reader device 304 (or vice versa) via a near field communications channel. In some embodiments, the thin client device 302 requests data from the reader device 304 transmits its device identifier (e.g., an alphanumeric identifier, a serial number, etc.), in response to receiving the request.

At S314, in response to the exchange at S312, the thin client device 302 transmits a request for the initialization key ($SP_{R\_Init}$) from the remote server computer 306. In some embodiments, the request includes the device identifier of the reader device 304.

At S316, the remote server computer 306 transmits the initialization key ($SP_{R\_Init}$). The initialization key need not be associated with the reader device 304 in particular, rather, in some cases the initialization key/key pair may be the same across all reader devices. In some cases, all reader devices manufacturer by a given manufacturer may share the same initialization key/key pair.

At S318, upon receiving the initialization key ($SP_{R\_Init}$) or at any suitable time, the thin client device 302 stores the initialization key in local memory.

In some embodiments, an initialization procedure may be performed with the thin client device 302 and reader device 304. During the initialization procedure, the thin client device 302 and reader device 304 exchange security assets (e.g., corresponding public keys different from $SP_{Init}$). During the initialization phase, thin client device 302 may operate in the particular operational mode (e.g., a "tap-in-play" mode) and may communicate with the reader device 304 via a communications interface (e.g., using an ISO 7816 interface). An applet (e.g., referred to as a VTRT applet) is initialized on the thin client device 302 and used to exchange Application Protocol Data Unit (APDU) commands and responses with the reader device 304.

The initialization procedure may begin at S320, where the reader device 304 selects an application identifier (AID) of a VTRT applet and transmits a message (e.g., a SELECT AID command to the thin client device 302 (e.g., via an APDU select command or response). In some embodiments, this selection may be in response to receiving from and/or transmitting to one or more APDU commands and/or responses with the thin client device 302.

In some embodiments, a SELECT AID command is utilized based on the following format:

| CLA | INS | P1 | P2 | Lc | Command Data | Le |
|---|---|---|---|---|---|---|
| 0x00 | 0xA4 | 0x04 | 0x00 | 0x0B | VTRT AID | 00 |

At S322, the thin client device 302 generates a unique identifier (e.g., a 16-byte unique identifier referred to as "TC_Reader_Init_ID"), a random nonce (e.g., a 16-byte random nonce referred to as "Nonce_TC"), and a first symmetric key SK1 derived from $SP_{R\_Init}$ and Nonce_TC. Nonce_TC and SK1 may be generated by thin client device 302 based on the requirements specified in NIST SP 800-56A Revision 3, Recommendation for Pair-Wise Key Establishment Schemes Using Discrete Logarithm Cryptography, Revision 3 Apr. 2018 (SP800-56Ar3). The thin client device 302 responds to the message received at S320 (e.g., an APDU select command) with an encrypted value. The encrypted value may be generated using any suitable encryption algorithm (e.g., Authentication Encryption Standard with Galois/Counter Mode (AES_GCM), or any suitable encryption algorithm). In some embodiments, the encryption algorithm takes as input first symmetric key SK1 and a concatenated value comprising TC_Reader_Init_ID and Nonce_TC).

At S324, the encrypted value is concatenated with Nonce_TC and the concatenated value is transmitted (e.g., in an APDU response such as a SELECT AID command response) with a data field "status word" set to the value 9000. The status word 9000 is used to indicate that the message is provided as part of an initialization procedure. Thus, the APDU response transmitted at S324 may include AES_GCM (SK1, TC_Reader_Init_ID||Nonce_TC)||Nonce_TC and status word 9000. It should be appreciated that the specific data transmitted in the message and/or the format of the data in the message provided in the example may differ in some embodiments.

In some embodiments, a response to a SELECT AID response is utilized based on the following format:

| Response Data | Trailer data |
|---|---|
| May include initial data settings as a response of FCI (e.g., using tag '6F'). In addition, tag BF0C may be utilized to return AES_GCM ($SS_{Init}$, TC_Reader_Init_ID || Nonce_TC) || Nonce_TC. | SW1SW2 |

Returned trailer data can include any suitable values such as:
 0x9000: indicating the application was selected successfully
 0x6A81: indicating that the command is not supported a card is blocked
 0x6A82: file is not found
 0x6283: indicating the application is blocked At S326, the reader device 304 receives the APDU message (e.g., SELECT AID command response) and decrypts it using SK1 (after independently generating SK1 using stored $SS_{R\_Init}$ and Nonce_TC obtained from the message). The reader device 304 generates an encrypted value using AES_GCM or any suitable encryption algorithm. For example, the encrypted value may be generated by providing SK1, a concatenation of $SP_{R\_Auth}$, KiC_Reader_ID, and Nonce_TC, and a Bluetooth identifier (e.g., a BLE name) associated with the reader device 304 (referred to as BLE_Name_Reader) as input to the encryption algorithm (notated by AES_GCM (SK1, $SP_{R\_Auth}$||KiC_Reader_ID||Nonce_TC, BLE_Name_Reader)). BLE_Name_Reader indicates a name associated with the reader device 304 that may be used for a BLE communication protocol. The BLE_Name_Reader may be integrity protected as Additional Authenticated Data (AAD) field in AES_GCM. The encrypted value is concatenated with BLE_Name_Reader. The reader device 304 generates, using SK1, a second symmetric key (referred to as "SK2") and use SK2 to encrypt a message (e.g., a SET DATA command) including the encrypted value. In some embodiments, SK2 may be some portion (e.g., the 12 left-most bytes of) SHA-256(SK1).

At S328, the reader device 304 transmits the message (e.g., the SET DATA command) to the thin client device 302. In some embodiments, a SET DATA command is utilized based on the following format. It should be appreciated that the specific data transmitted in the message and/or the format of the data in the message provided in the example may differ in some embodiments.

| CLA | INS | P1 | P2 | Lc | Command Data | Le |
|---|---|---|---|---|---|---|
| 0x80 | 0xEA | 0x00 | 0x00 | 0x64 | Tag '5F' with length 0x0640 00 may include 64 byte encrypted data following with tag '8F' with maximum length 0x20 that contains 32 bytes BLE_Name_Reader. An example of such data can include AES_GCM (SK1, $SP_{R\_Auth}$ || KiC_Reader_ID || Nonce_TC, BLE_Name_Reader) || BLE_Name_Reader). BLE_Name_Reader may be sent as Additional Authentication Data (AAD) of AES_GCM, which may be a maximum of 32 bytes. | |

At S330, the thin client device 302 receives the APDU message (the SET DATA command) and decrypts it using SK2 (e.g., computed by the thin client device 302 by SHA_256 (SK1)). Thin client device 302 verifies the Nonce_TC from the message by comparing the Nonce_TC received at S330 to the Nonce_TC generated at S322. If the Nonce_TCs do not match, the thin client device 302 may discard the message and processing may cease. If the Nonce_TCs match, the thin client device 302 may consider the message verified and generates an ECC P-256 key pair (e.g., a private and public key pair individually referred to as "$SS_{TC\_Auth}$" and "$SP_{TC\_Auth}$", respectively). The thin client device 302 generates a random seed (e.g., a 16-byte random seed referred to as "Seed_TC") and associates the one or both keys with any suitable combination of the KiC_Reader_ID, BLE_Name_Reader, and/or Seed_TC. In some embodiments, the thin client device 302 validates $SP_{R\_Auth}$, the public key of the reader device 304, based on section 5.6.2.2.3 of SP800-56Ar3. The thin client device 302 generates an encrypted value using any suitable encryption algorithm (e.g., AES_GCM) using SK1, a concatenation of $SP_{TC\_Auth}$, Seed_TC, and a hashed value generated with a hashing algorithm (e.g., SHA-256) a concatenation of KiC_Reader_UD and TC_Reader_Init_ID, and status 9000. In some embodiments, the encrypted value is denoted by AES_GCM ($SS_{Init}$, $SP_{TC\_Auth}$, ||Seed_TC||SHA-256 (KiC_Reader_ID|| TC_Reader_Init_ID)). The thin client device 302 generates another symmetric key (referred to as "SK3") from SK2 and SK3 to encrypt a message (e.g., a SET DATA response) including the encrypted value and status word 9000. In some embodiments, SK3 may be computed by SHA-256(SK2).

At S332, the thin client device 302 transmits the message (e.g., the SET DATA command response) to the reader device 304. The SET DATA command response may be utilized according to the following format. It should be appreciated that the specific data transmitted in the message and/or the format of the data in the message provided in the example may differ in some embodiments.

| Response Data | Trailer data |
|---|---|
| Response data may include encrypted data (e.g., SK1, $SP_{TC\_Auth}$, || Seed_TC || SHA-256 (KiC_Reader_ID || TC_Reader_Init_ID)). In some embodiments, the response data may utilize tag '7F'. In case of any error, the applet may not return any data other than, for example, an error code. | SW1SW2 |

Response data may include trailer data such as:
- 0x9000: indicating the Set Data command is successful.
- 0x6980: indicating an incorrect data length. This error message may be returned when the expected number of bytes are not received.
- 0x6981: indicating the TC does not recognize the reader. This can occur when the returned Nonce_TC could not be verified by the TC.
- 0x6982: indicating that AES-GCM authentication failed.
- 0x6983: indicating that data could not be decrypted correctly.
- 0x6984: indicating any suitable error not listed above.

At S334, the reader device 304 decrypts the received message (e.g., the SET DATA command response) using SK3 (e.g., computed by the reader device 304 by SHA-256 (SK2)). The reader device 304 verifies the message based at least in part on independently computing SK3. If the message is not verified, the reader device 304 may discard the message and processing ceases. If the message has been verified, the reader device 304 stores the public key $SP_{TC\_Auth}$ of the thin client device 302 and the Seed_TC obtained from the message. In some embodiments, the reader device 204 may store an association between the public key of the thin client device 302 ($SP_{TC\_Auth}$) and Seed_TC obtained from the message with TC_Reader_Init_ID.

At S334, if the message received at S334 is verified, the reader device 204 transmits an APDU message (e.g., a SESSION READY command) indicating the receipt of message transmitted at S332 was successful.

In some embodiments, a SESSION READY command is provided in the following format

| CLA | INS | P1 | P2 | Lc | Command Data | Le |
|---|---|---|---|---|---|---|
| 0x80 | 0xEB | 0x00 | 0x00 | 0x02 | If the Set Data response was received and validated successfully, 0x0000 can be sent as data. Otherwise, the response data may be erroneous and the initialization phase may be restarted from step 1. 0xF001: Data authentication failed 0xF002: Data could not be decrypted 0xF003: Wrong data length 0xF004: Reader does not recognize the TC. 0xF005: Other types of error. | N/A |

During the initialization phase, in case of any type of error such as invalid data, time out, tearing, operational failures, etc., the communication can be aborted. Different status words are defined for potential errors. In some embodiments, before operations cease, the device that identifies an error transmits an APDU message with a status word indicating the particular error to the other device.

Although not depicted, in some embodiments, the thin client device 302 sends the response to the Session Ready command as: 0x9000: indicating the session ready command was received successfully, 0x6985: indicating unexpected response data, or 0x9656: indicating another error.

If the thin client device 302 does not receive the SESSION READY command, the communication can be aborted. All the generated keys and nonce values are securely removed from the reader device 304 and the thin client device 302.

Although not depicted, in some embodiments, if the thin client device 302 has a power reset a RESET command may be sent to the reader device 304 specifying that new session keys are required to be negotiated.

The Power Reset command may be defined as: (for reader device 304 to thin client device 302) KiC_Reader_ID∥PWRST as signed using ECDSA and $SS_{R\_Auth}$ or (for thin client device 302 to reader device 304) TC_Reader_Init_ID∥PWRST as signed using ECDSA and $SS_{TC\_Auth}$. In some embodiments, if the signature was valid within the power reset command, the thin client device 302 and reader device 304 discard the current session keys and securely remove all the stored security assets.

Although not depicted, in some embodiments, a timer and transaction counter associated with the session keys are reset. These timers and transaction counters can be utilized as parameters that specify the session keys' life cycle. The session keys can be renegotiated after 'X' configurable transactions or seconds. In some embodiments, power reset commands have priority over any other operation. Thus, in some cases, receiving power reset by TC or reader may cause other operations to be interrupted and discarded.

Pairing reset refers to returning to initialization procedure (starting at S320), in which the reader device 304 and the thin client device 302 share their authentication public keys using the applet over NFC. In case of secure channel communication errors between the thin client device 202 and the reader device 304 that cannot be solved by power reset, such as failing to validate signatures, KC_MAC_TAG, Session_MAC_Tag, etc., the thin client device 302 and the reader device 304 may request pairing reset by sending a PAIRING RESET command. Upon pairing reset, the thin client device 302 and the reader device 304 return to the initialization procedure (starting at S320) in which the authentication public keys and other parameters are exchanged using the applet over NFC.

A PAIRING RESET command may be formatted as follows: (for reader device 304 to thin client device 302): KiC_Reader_ID∥PRNGRST as signed using ECDSA and $SS_{R\_Auth}$ and (for thin client device 302 to reader device 304): TC_Reader_Init_ID∥ PRNGRST signed using ECDSA and $SS_{TC\_Auth}$. In some embodiments, if the signature was validated, the thin client device 302 and the reader device 304 securely erase all (or some portion) of the previously stored security assets.

In summary, the following table illustrate some of the data generated, stored, and exchanged between the thin client device 302 and the reader device 304 during the initialization procedure.

| | Thin Client Device | Reader Device |
|---|---|---|
| Generates | ECC 256 key pair ($SS_{TC\_Auth}$, $SP_{TC\_Auth}$) 16-byte random seed Seed_TC | |
| Stores | 16-byte nonce: TC_Nonce (for session validation) 16-byte unique identifier: TC_Reader_Init_ID Reader's public key $SP_{R\_Auth}$ KiC_Reader_ID BLE_Name_Reader ECC 256 key pair ($SS_{TC\_Auth}$, $SP_{TC\_Auth}$) | TC's public key: $SP_{TC\_Auth}$ Unique identifier: TC_Reader_Init_ID Random seed Seed_TC |

In some embodiments, multiple reader devices are connected to a single thin client device using unique BLE names (e.g., BLE_Name_Reader corresponding to each reader device) and unique reader IDs (e.g., a KiC_Reader_ID corresponding to each reader device). A unique key pair ($SS_{TC\_Auth}$, $SP_{TC\_Auth}$) associated with the BLE_Name_Reader and KiC_Reader_ID is generated for each initialized reader device. Session key negotiation may be established independently for each reader device over BLE using BLE_Name_Reader and unique parameters and authentication keys per the protocol 400 described below in connection with FIG. 4. Prior to session key negotiation, the thin client device and the reader device are paired to communicate over BLE. For a successful BLE pairing, the reader device may cast its BLE name (BLE_Name_reader) that was sent to the thin client device during the initialization procedure described above. The thin client device may search for the reader that is initialized using the BLE_Name_Reader. The thin client device can refuse connection to a reader that has not successfully initialized and may fail the BLE connection with an appropriate error message such as: "No Initialized Reader Found". In some embodiments, if the thin client device detects more than one initialized reader, it prompts a user (e.g., via an interface provided by the thin client device) to choose a reader (e.g., based on the BLE_Name_Reader).

In some embodiments, the remote server computer may maintain the initialization keys without transmitting them to the thin client device 302. In some embodiments, instead of the thin client device 302 performing the message encryption as described above, the thin client device 302 may instead provide any suitable information such that the remote server computer 306 may generate the message and encrypt the message to provide the thin client device 302 with the encrypted message which may be sent to the reader device 302. Thus, in some embodiments, the remote server computer 306 may perform any suitable encryption and/or decryption and/or verification operations discussed above on behalf of the thin client device 302.

Figure 4:
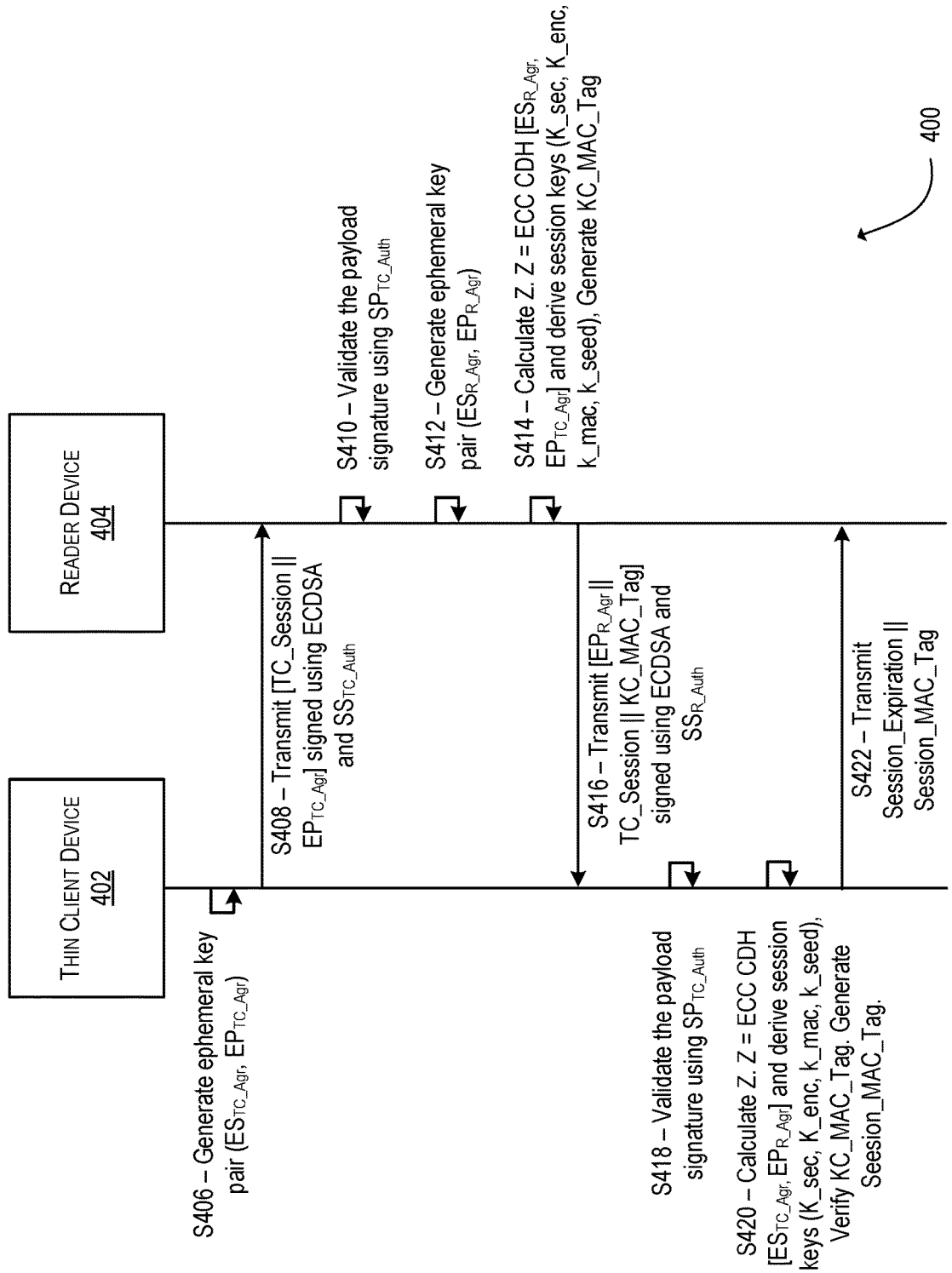
FIG. 4 shows a flow diagram of a protocol for establishing a secure connection between a thin client and a reader device, in accordance with some embodiments.

FIG. 4 shows a block diagram of a protocol 400 for establishing a secure connection between a thin client device 402 (an example of the protocol management computer 112 of FIG. 1) and a reader device 404 (an example of the reader device 110 of FIG. 1). In some embodiments, the secure connection may utilize one or more session keys generated during a session key negotiation. the session key negotiation may conform to a particular standard (e.g., SP800-56Ar3), By way of example, thin client device 402 and reader device 404 may generate a shared secret Z (e.g., a session key) using, for example, two static (for authentication) and two ephemeral key pairs. As a non-limiting example, the thin client device 402 and reader device 404 may perform the protocol 400 outlined below. It should be appreciated that a protocol for establishing a secure connection can include more or fewer steps than those outlined below, and the following steps may be performed in any suitable order.

The protocol 400 may begin at S406, where the thin client device 402 generates ephemeral key pair, ($ES_{TC\_Agr}$, $EP_{TC\_Agr}$), using an Elliptic Curve Cryptography (ECC) algorithm (e.g., ECC P-256) and domain parameters (q, FR, a, b{,SEED}, G, n, h), based on section 5.6.1.2 of SP800-56Ar3, where q is a field size (e.g., where q is an odd prime or is equal to $2^m$ for some prime integer m), FR is a field representation parameter that is used to provide additional information concerning the method used to represent elements of the finite field GF(q). FR is set to a null value if q is equal to an odd prime p. The elements of the finite field may be represented by the integers 0 through p−1. When $q=2^m$, the elements of $GF(2^m)$ may be represented by bit strings of length m, with each bit indicating the coefficient (0 or 1) of a specific element of a particular basis for $GF(2^m)$ viewed as a vector space over GF(2). FR may be null if $q=2^m$ and the representation of field elements corresponds to a Gaussian normal basis for $GF(2^m)$. If $q=2^m$, and the representation of field elements corresponds to a polynomial basis, then FR may specify the reduction polynomial—either a trinomial or a pentanomial. The parameters a and b may be elements of GF(q) that define the equation of an elliptic curve. G=($x_G$, $y_G$) may be an affine point on the elliptic curve determined by a and b that is used to generate a cyclic subgroup of prime order n. The parameter h may be the cofactor of the cyclic subgroup generated by G. The bit string SEED may be an optional parameter used in an approved process for generating and validating a, b, and possibly G (depending on the method of generation).

At S408, the thin client device 402 transmits a concatenation of TC_Session and $EP_{TC\_Agr}$ (e.g., TC_Session||$EP_{TC\_Agr}$) as signed with $SS_{TC\_Auth}$ using elliptic curve digital signature algorithm (ECDSA) to the reader device 404. TC_Session may be a 16 byte randomly generated nonce generated/initialized by the thin client device 402 and refreshed for each key agreement based on section 5.2 of SP800-56Ar3.

At S410, upon receiving the above message, the reader device 404 verifies the signature of the message using the public key of the thin client device (e.g., $SP_{TC\_Auth}$).

At S412, if the signature verification is successful, the reader device 404 generates an ECC P-256 ephemeral key pair, ($ES_{R\_Agr}$, $EP_{R\_Agr}$), from the domain parameters (q, FR, a, b{,SEED}, G, n, h), based on section 5.6.1.2 of SP800-56Ar3 as described above.

At S414, the reader device 404 generates the shared secret Z. In some embodiments, Z=ECC CDH ($ES_{R\_Agr}$, $EP_{TC\_Agr}$). The reader device 404 may derive share session keys based on section 5.2 of SP800-56Ar3. The ECC CDH primitive may be defined in section 5.7.1.2 of SP800-56Ar3. In some embodiments, the reader device 404 may generate key generation confirmation tag: KC_MAC_Tag based on section 5.3 of SP800-56Ar3.

At S416, the reader device 404 transmits to the thin client device 402 a concatenated value (e.g., $EP_{R\_Agr}$||TC_Session||KC_MAC_Tag) as signed using ECDSA and $SS_{R\_Auth}$.

At S418, the thin client device 402 validates the signature of the received message using the public key of the reader device 404 ($SP_{R\_Auth}$).

At S420, upon validation of the signature, the thin client device 402 generates the shared secret as Z=ECC CDH ($ES_{TC\_Agr}$, $EP_{R\_Agr}$). ECC CDH primitive is defined in section 5.7.1.2 of SP800-56Ar3. Similar to the reader device 404 and following the procedure specified in section 5.2 of SP800-56Ar3, the thin client device 402 may derive shared session keys, generate KC_MAC_Tag and verify it with the one received from the reader device 404 to ensure the same session keys are derived by the reader device 404.

At S422, to finalize the negotiation, the thin client device 402 sends Session_Expiration||Session_MAC_TAG to the reader device. The Session_Expiration may be defined as: dd.mm.yy-hh:mm, although another suitable format may be utilized. The Session_MAC_TAG may be generated based on section 5.3 of SP800-56Ar3. Upon receiving and validating the Session_MAC_TAG, the reader device 404 is configured to communicate with thin client device 402 to conduct payment transactions until the session expiration is reached.

In some embodiments (e.g., during protocol 400, also referred to as the key negotiation scheme), if invalid data is detected, signature verification fails, or a time period has elapsed from a time when a message was last exchanged between the two devices, the communication can be aborted.

In one embodiments, three session keys are derived from the shared secret Z. In some embodiments, these session keys are derived according to a particular standard (e.g., ConcatKDF [SP-800-56Ar2]). The table below provides a number of parameters for a key derivation method.

| | |
|---|---|
| Auxiliary function | SHA-256 |
| L | 768 |
| Fixedinfo: AlgorithmID||PArtyUInfo||PartyVInfo | "AES128GCM" || Seed_TC || KiC_Reader_ID || TC_Reader_Init_ID || TC_Session |

In some embodiments, using the process described in section 4.1 of SP800-56C, DerivedKeyMaterial with length L=768 is generated. Four shared session keys K_enc, K_mac, K-sec, and K_seed may be generated. Each key may be 128 bits, 256 bits, 128 bits, and 256 bits from the leftmost bit of DerivedKeyMaterial, respectively. In some embodiments, the shared session keys may be concatenated to express the DerivedKeyMaterial. This may be expressed by the notation:

(K_enc||K_mac||K_sec||K_seed)=DerivedKeyMaterial

In some embodiments, K_seed key is used for updating the TC_Seed and TC_Session to be used for the next session key generation. The thin client device 402 and the reader device 404 can utilize the following procedure to update the Seed_TC and TC_Session:

New_Session_Seed=HMAC(SHA-256,K_seed,Seed_TC||TC_Session)

Seed_TC and TC_Session are refreshed where the new seed, Seed_TC, includes the 16-byte leftmost of New_Session_Seed above. TC-Session may include the rightmost 16-bytes of the New_Session_Seed.

To ensure that the thin client device 402 and the reader device 404 derived the same session keys, a KC_MAC_Tag is generated and sent to the reader device 404. The KC_MAC_Tag may be a concatenation of a number of data fields. For example, KC_MAC_Tag may be expressed as HMAC (SHA-256, K_mac, $EP_{TC\_Agr}$|| $EP_{R\_Agr}$||KiC_Reader_ID||TC_Reader_Init_ID||TC_Session).

If the thin client device 402 also generates the same KC_MAC_Tag, the secure channel establishment can be considered completed. Otherwise, the thin client device 402 sends an associated error message to discard the session key negotiation. In some embodiments, to finalize the key negotiation, thin client device 402 generates a Session_

MAC_TAG (e.g., Session_MAC_TAG=HMAC (SHA-256, k_mac, Seed_TC II TC_Session).

Some exemplary applications of the session keys may be as follows:

| | |
|---|---|
| K_enc | AES 128 bits key used for payload encryption |
| K_mac | AES 256-bit key used for payload authentication |
| K_sec | AES 128-bit used for sensitive data encryption within the message |
| K_seed | AES 128-bit key used to update the Seed_TC for the next session key generation. |

Figure 5:
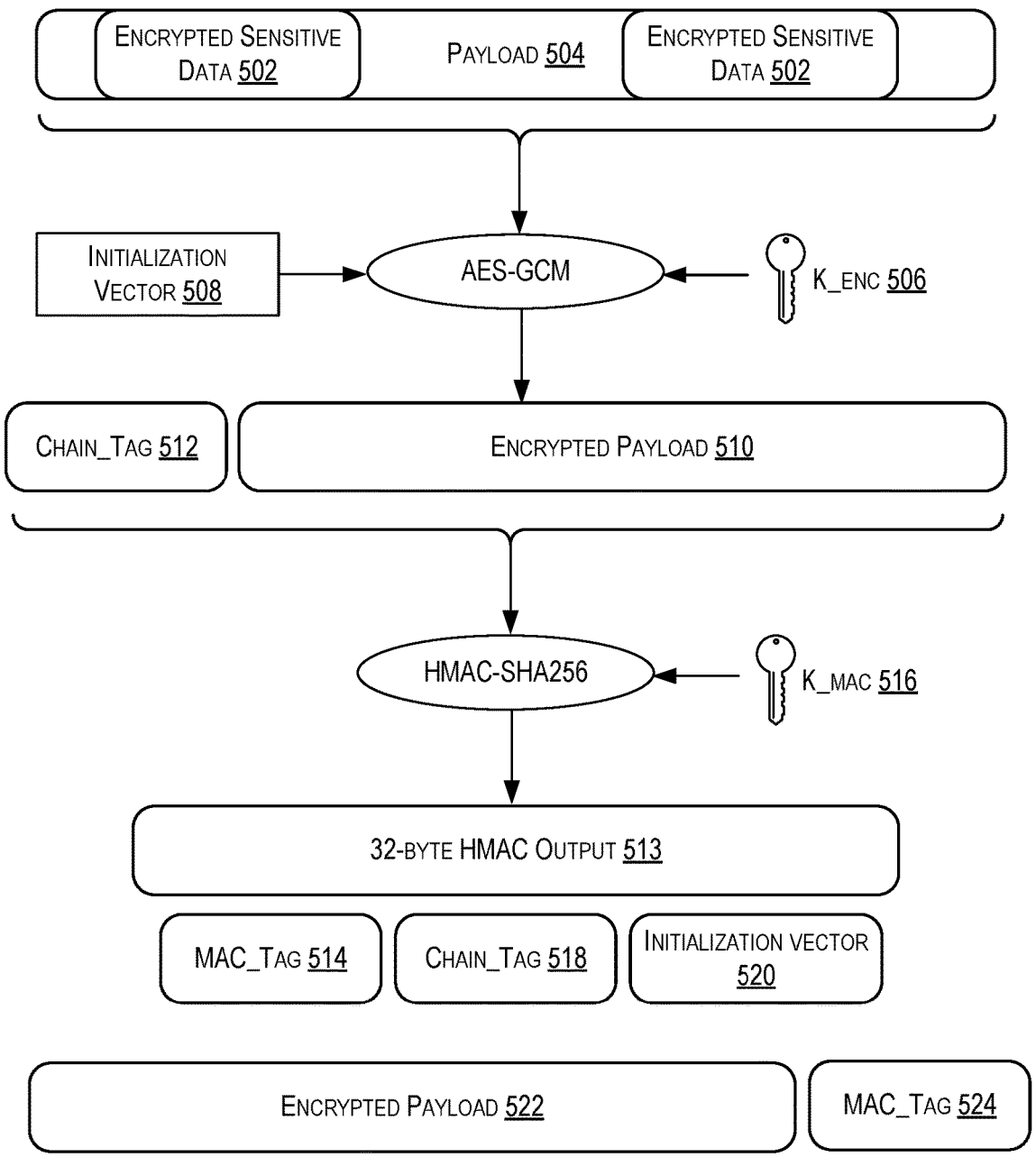
FIG. 5 shows a block diagram illustrating a scheme for secure messaging, in accordance with some embodiments.

FIG. 5 shows a block diagram illustrating a scheme for secure messaging, in accordance with some embodiments. AES-GCM may be used for payload encryption (e.g., to generate encrypted payload 510 including payload 504 and encrypted sensitive data 502). In some embodiments, sensitive data may be encrypted using K_sec (the K_sec generated in connection with FIG. 4) first as a part of the payload 504, which can then be further encrypted using K_enc 506 (e.g., the K_enc generated in connection with FIG. 4) to generate encrypted payload 510. In some embodiments, the initialization vector 508 is initialized to the leftmost 12 bytes of TC_Seed (e.g., the TC_Seed discussed in connection with FIG. 2 and FIG. 3). The initialization vector 508 may be refreshed for each payload encryption.

An 8-byte MAC_Tag 514 is generated from the encrypted payload 510 using HMAC according to FIPS-198 with SHA-256 for integrity protection according to GP-SCP03 and K_mac 516 (e.g., the K_mac generated in connection with FIG. 4). In some embodiments, MAC_Tag 514 is generated form an encrypted payload and Chain_Tag 518 (e.g., a 16-byte value) can be initialized to zero. The leftmost 8 bytes of the 32-byte HMAC output 513 is used as the MAC_Tag 514 and sent with the encrypted payload. Bytes 9 to 24 of the HMAC output can be used as the new Chain-Tag (e.g., Chain_Tag 518) for the next MAC_Tag generation. In some cases, Bytes 21 to 32 of the HMAC output are used as the new IV (e.g., initialization vector 520) to generate the next encrypted payload.

The following steps are performed to generate the encrypted payload 522 with MAC_Tag 524:
1) Initialization Vector 508=The leftmost 12 bytes of Seed_TC
2) Chain-Tag 512=0
3) Encrypted_Payload 510=AES-GCM (K_enc, payload 504). Initialization vector 508 from step 1 is used.
4) MAC_Tag 514||Chain_Tag 518||Initialization Vector 520=HMAC-SHA256 (K_mac, Chain_Tag 512||Encrypted_Payload 510)
5) Output: (Encrypted_Payload 522, MAC_Tag 524)
6) Initialization vector 508=Initialization vector 520
7) Chain_Tag 512=Chain_Tag 518
8) Repeat steps 3 to 7 (e.g., until the session is over)

On the receiver side, similar steps are followed to verify the MAC_Tag 524 and decrypt the encrypted payload 522.
1) IV=the leftmost 12 bytes of TC_Seed
2) Chain-Tag=0
9) Input: (Encrypted_Payload 522, MAC_Tag 524)
3) Payload=AES-GCM (K-enc, Encrypted_Payload 522); also verify payload integrity
4) Gen_MAC_Tag||New_Chain_Tag||New_IV=HMAC-SHA256 (K_mac, Chain_Tag II Encrypted_Payload 522)
5) If (Gen_MAC_Tag=MAC_Tag 524) and payload integrity is verification in step 3
   a. IV=New_IV
   b. Chain_Tag=New_Chain_Tag
6) Else
   a. Send a related error message and discard the received message.

In some embodiments, the same initialization vector may be used for encrypting and decrypting the sensitive data using K_sec.

In some embodiments, the session keys may be renegotiated (e.g., within 24 hours, every 100 transactions, whichever occurs first, etc.). In some embodiments, the previous session keys may be securely deleted from the reader device (e.g., when the session expires). Any suitable intermediate data including Z, the thin client device's ephemeral public and private keys ($ES_{TC\_Agr}$, $EP_{TC\_Agr}$) and/or the reader device's ephemeral public and private keys ($ES_{R\_Agr}$, $EP_{R\_Agr}$), Nonce, etc. can be discarded by the thin client device (e.g., the thin client device 402 of FIG. 4) and the reader device (e.g., the reader device 404 of FIG. 4) at any suitable time (e.g., after the session keys are derived and nonce values are refreshed).

Figure 6:
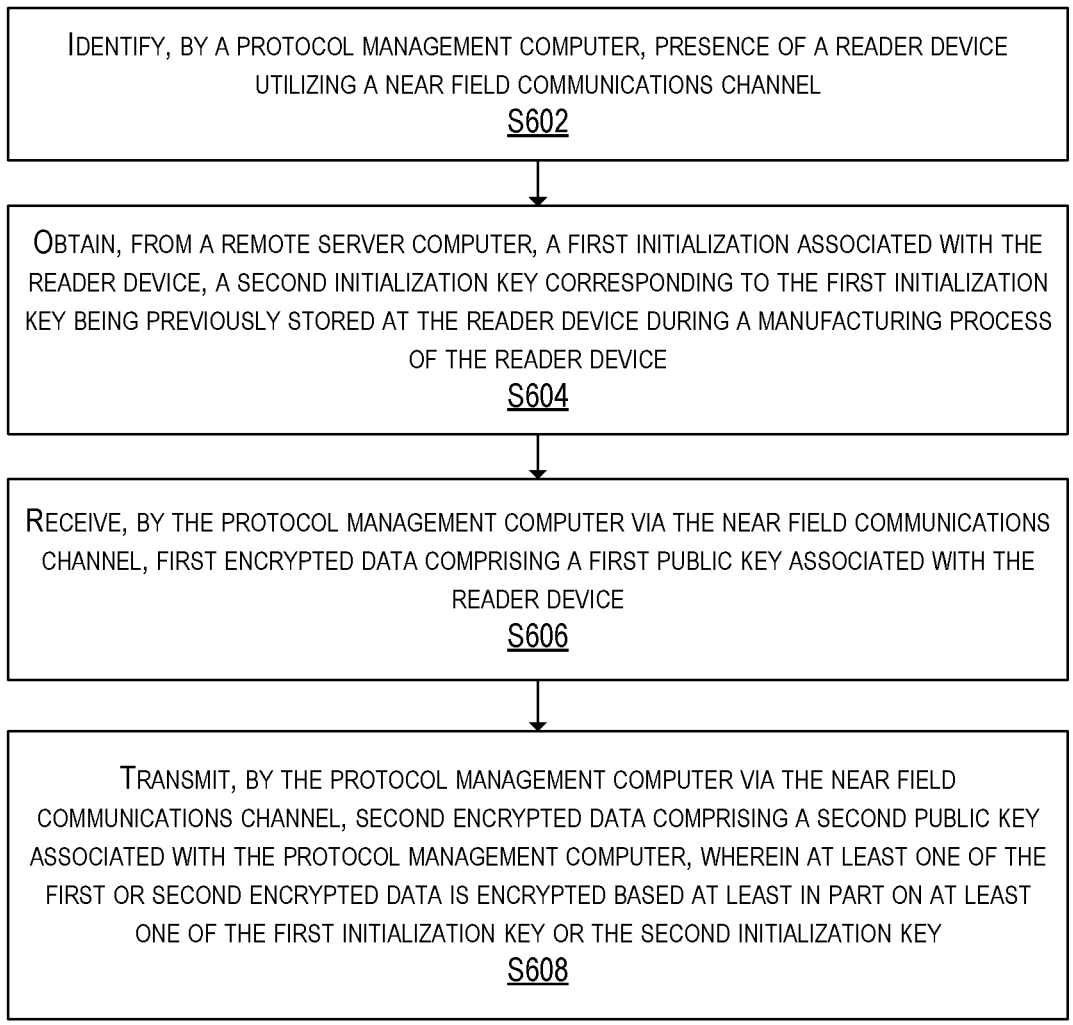
FIG. 6 shows a flowchart illustrating an exemplary method of securely exchanging public keys between two devices, in accordance with some embodiments.

FIG. 6 shows a flowchart illustrating an exemplary method 600 of securely exchanging public keys between two devices, in accordance with some embodiments. The method 600 may be performed by the protocol management computer 112 of FIG. 1 (an example of the thin client device 202-402 of FIGS. 2-4). The method 600 may include more or fewer steps and may be performed in any suitable order.

The method 600 may begin at S602, where presence of a reader device is identified by the protocol management computer. By way of example, the protocol management computer may operate as a contactless portable device. When the protocol management computer and the reader device are brought within a threshold distance of one another, data may be communicated between the devices (e.g., from the reader device to the protocol management computer or vice versa). Through this communication, the protocol management computer identifies the presence of the reader device.

At S604, the protocol management computer obtains, from a remote server computer, a first initialization key (e.g., K_init as described in FIG. 2, or $SP_{R\_Init}$ as described in FIG. 3) associated with the reader device. In some embodiments, a second initialization key (e.g., K_init as described in FIG. 2, or $SS_{R\_Init}$ as described in FIG. 3) corresponding to the first initialization key is previously stored at the reader device (e.g., during a manufacturing process of the reader device). In some embodiments, like the one described in FIG. 2, the first and second initialization keys are the same symmetric key (e.g., a shared secret). In other embodiments, like the one described in connection with FIG. 3, the first initialization key comprise at least one of an asymmetric key pair (e.g., $SP_{R\_Init}$ as described in FIG. 3).

At S606, the protocol management computer receives, via the near field communications channel, first encrypted data comprising a first public key associated with the reader device as described in connection with FIGS. 2 and 3. In some embodiments, the first encrypted data is received via a SET DATA message as described above.

At S608, the protocol management computer transmits, via the near field communications channel, second encrypted data comprising a second public key associated with the protocol management computer. In some embodiments, at least one of the first or second encrypted data is encrypted based at least in part on at least one of the first initialization key or the second initialization key (e.g., as described in FIGS. 2 and 3).

Figure 7:
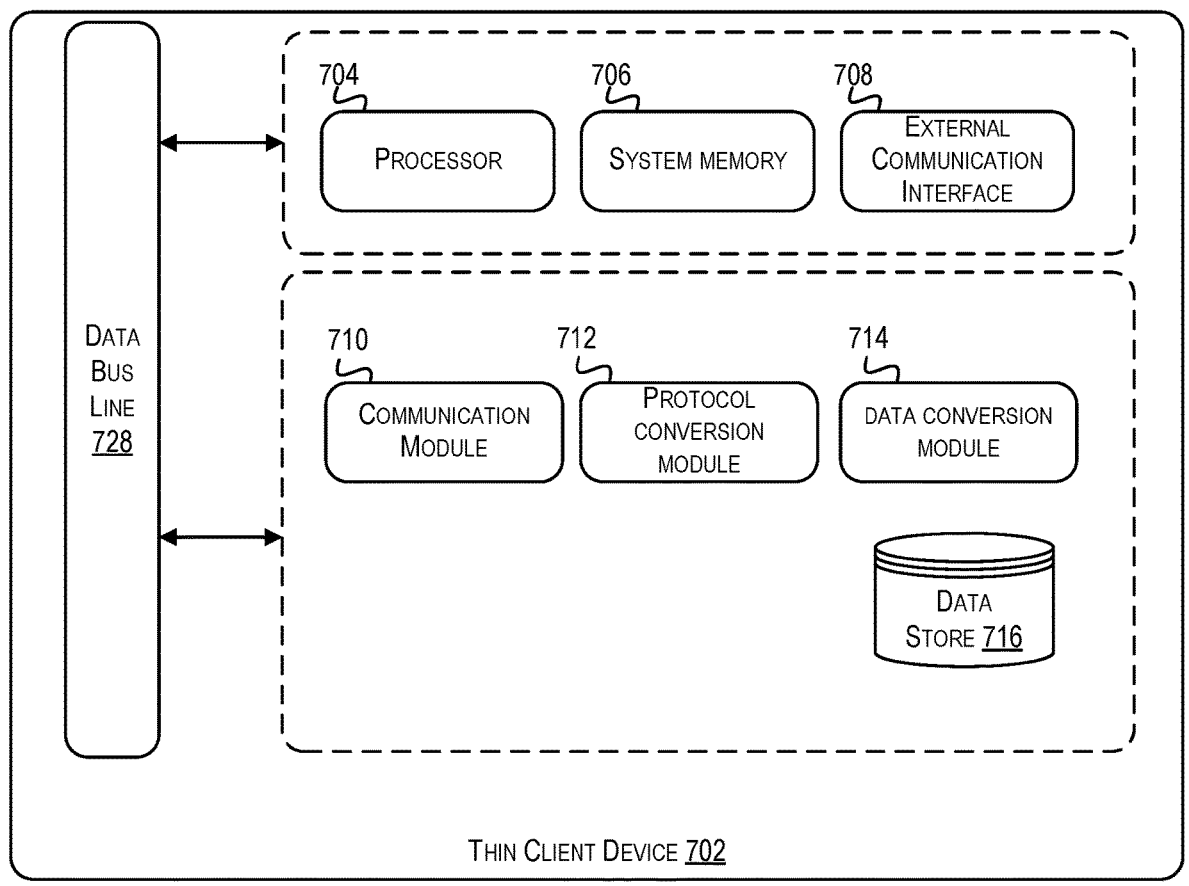
FIG. 7 depicts a block diagram of a thin client device, in accordance with some embodiments.

FIG. 7 depicts a block diagram of a thin client device 702 (an example of the protocol management computer 112 of FIG. 1, of thin client devices 202, 302, and/or 402, of FIGS. 2-4, etc.), in accordance with some embodiments. The thin client device 702 is illustrated as comprising a plurality of hardware and software modules (704-714). However, it should be appreciated that this is provided for illustration purposes only, and each of the modules and associated functionality may be provided and/or performed by the same or different components. That is, the thin client device 702 may, for instance, perform some of the relevant functions and steps described herein with reference to the protocol management computer 112 of FIG. 1, thin client devices 202-404 of FIG. 2-4, respectively, through the use of any suitable combination of software instructions and/or hardware configurations.

The thin client device 702 is shown as comprising a processor 704, system memory 706, and an external communication interface 708. Moreover, one or more of the modules 710-716 may be disposed within one or more of the components of the system memory 706, or may be disposed externally. The processor 704, system memory 706 and/or external communication interface 708 may be used in conjunction with any of the modules described below to provide a desired functionality. Some exemplary modules and related functionality may be as follows.

A communication module 710 may be configured or programmed to perform some or all of the functionality associated with receiving, sending, and generating electronic messages for transmission at the thin client device 702 to be transmitted to a reader device (e.g., the reader device 110 of FIG. 1). By way of example, the communication module 710 may be configured to perform the functionality described in connection with thin client device 202 of FIG. 2 as part of the protocol 200 and/or thin client device 302 of FIG. 3 as part of the protocol 300. Communication module 710 may be configured to cause the processor 704 to perform any suitable functionality performed by the thin client device 402 as described in connection with FIG. 4. When an electronic message is received by the thin client device 702 via the external communication interface 708, it may be passed to the communication module 710. The communication module 710 may identify and parse the relevant data based on a particular messaging protocol used by the thin client device 702. The communication module 710 may then transmit any received information to an appropriate module within the thin client device 702 (e.g., via a data bus line 728). The communication module 710 may also receive information from one or more of the modules in the thin client device 702 and generate an electronic message in an appropriate data format in conformance with a transmission protocol used in the thin client device 702 so that the message may be sent to one or more entities (e.g., to the remote server computer 114 of FIG. 1). The electronic message may then be passed to the external communication interface 708 for transmission.

A communication module 710 may be configured to cause processor 704 to perform some or all of the functionality associated with communicating with reader devices, portable devices (e.g., portable device 106 of FIG. 1), and/or remote server computers (e.g., remote server computer 114 of FIG. 1). In particular, the communication module 710 may be responsible for (1) establishing, maintaining, and terminating a session with a one or more reader devices, portable devices, and/or remote server computers, (2) allowing the exchange of messages within a given session, (3) and allowing multiple sessions to coexist.

The protocol conversion module 712 may be configured to cause processor 704 to perform some or all of the functionality associated with converting communications sent between portable devices (via the reader device 110 of FIG. 1) and a remote server computer (e.g., the remote server computer 114) from one communication protocol to another. The protocol conversion module 712 may be responsible for determining what communication protocol (e.g., EMV 1.0 or EMV 2.0) a particular device is configured to use. Based on this determination, the protocol conversion module 712 may handle the conversion of communications exchanged for a transaction if requested. For example, a communication originating from the portable device 108 of FIG. 1 may be received by the communication module 710 (e.g., from reader device 110 of FIG. 1). Based on a determination that the portable device 108 uses the second communication protocol while the remote server computer 114 uses the first communication protocol, the protocol conversion module 712 may convert the communication from the second communication protocol to the first communication protocol before forwarding the converted communication to the remote server computer 114.

In particular, the protocol conversion module 712 may be responsible for (1) requesting the communication module 710 to establish, maintain, and terminate a session with a portable device and a remote server computer, and (2) synchronizing the exchange of messages between the portable device and the remote server computer 114 in order to optimize performance and minimize the number of communications exchanged with the remote computer.

In order to do so, the protocol conversion module 712 may be configured or programmed to (1) create, format, and exchange as many messages as necessary within a given session, to fulfill as many as possible data requests from the remote computer and (2) create, format, and exchange as many messages as necessary within a given session, to fulfill as many as possible data requests from the portable device.

The data conversion module 714 may be configured to cause the processor 704 to perform some or all of the functionality associated with converting data sent between portable devices 106-108 and the remote server computer 114 from one data format (e.g., associated with the first communication protocol) to another (e.g., the format associated with the second communication protocol) and vice versa. The data conversion module 714 may be responsible for determining what communication protocol (e.g., EMV 1.0 or EMV 2.0) a particular portable device is configured to use. Based on this determination, the data conversion module 714 may handle the conversion of data exchanged for a transaction if requested. For example, a communication originating from the portable device 108 may be received by the communication module 710 (e.g., via the reader device 110). Based on a determination that the portable device 108 uses the second communication protocol while the remote server computer 114 uses the first communication protocol, the data conversion module may convert the data format associated with the second communication protocol to the format appropriate for the first communication protocol before forwarding the converted data to the remote server computer 114.

In some embodiments, the thin client device 702 may include data store 716. Data store 716 may be configured to store any suitable data discussed in connection with FIGS. 2-4 (e.g., data described as being stored at the thin client devices 202, 302, 402, etc.).

Figure 8:
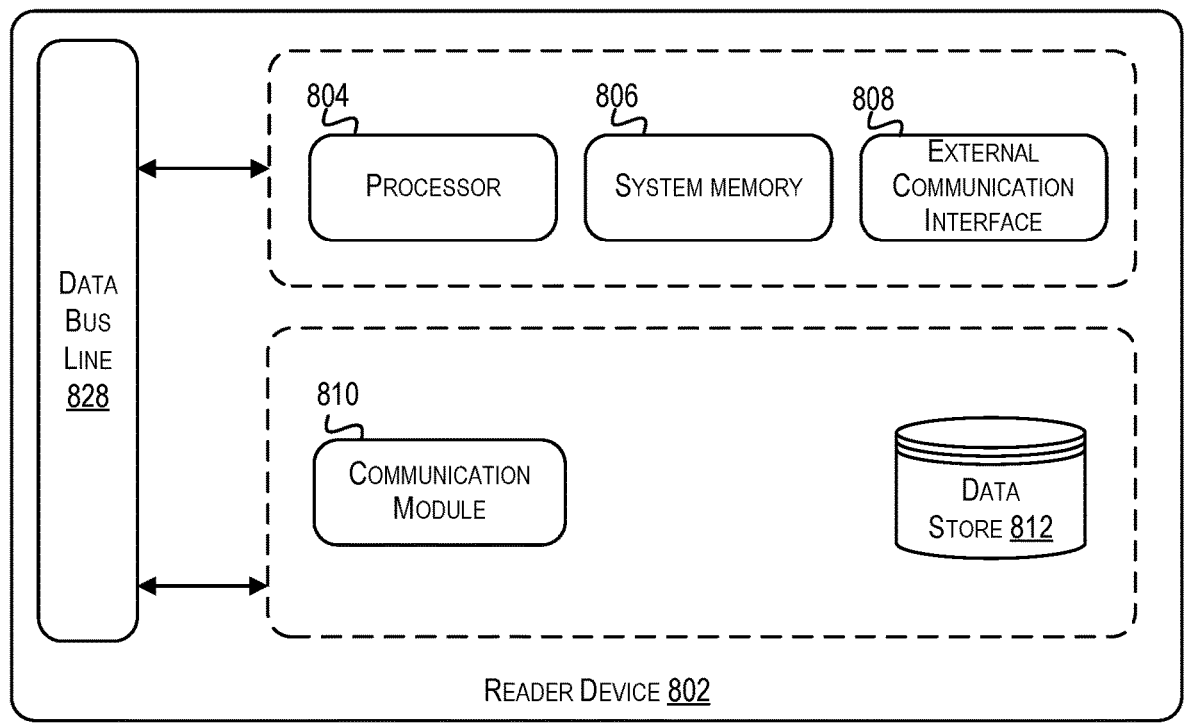
FIG. 8 depicts a block diagram of a reader device, in accordance with some embodiments.

FIG. 8 depicts a block diagram of a reader device 802 (an example of the reader device 110, 204, 304, and/or 404 of FIGS. 1-4, respectively), in accordance with some embodiments. The reader device 802 is illustrated as comprising communication module 810. However, it should be appreciated that this is provided for illustration purposes only, and that the associated functionality of communication module 810 may be provided and/or performed by the same or different components. That is, the reader device 802 may, for instance, perform some of the relevant functions and steps described herein with reference to the reader devices 110, 204, 304, and/or 404 through the use of any suitable combination of software instructions and/or hardware configurations.

The reader device 802 is shown as comprising a processor 804, system memory 806, and an external communication interface 808. Moreover, the communication module 810 may be disposed within one or more of the components of the system memory 806, or may be disposed externally. The processor 804, system memory 806 and/or external communication interface 808 may be used in conjunction with the communication module 810 to provide a desired functionality. Some exemplary functionality is described below.

A communication module 810 may be configured or programmed to perform some or all of the functionality associated with receiving, sending, and generating electronic messages for transmission at the reader device 802 to be transmitted to a thin client device (e.g., the protocol management computer 112 of FIG. 1, an example of the thin client device 202, 302, and/or 402, of FIGS. 2-4, respectively). By way of example, the communication module 810 may be configured to perform the functionality described in connection with reader device 204 of FIG. 2 as part of the protocol 200 and/or the reader device 304 of FIG. 3 as part of the protocol 300. Communication module 810 may be configured to cause the processor 604 to perform any suitable functionality performed by the reader devices 304 and 404 as described in connection with FIGS. 3 and 4, respectively. When an electronic message is received by the reader device 802 via the external communication interface 808, it may be passed to the communication module 810. The communication module 810 may identify and parse the relevant data based on a particular messaging protocol used by the reader device 802.

A communication module 810 may be configured to cause processor 804 to perform some or all of the functionality associated with communicating with portable devices (e.g., portable device 106 and/or portable device 108 of FIG. 1), and/or thin client devices (e.g., the protocol management computer 112 of FIG. 1, the thin client devices 202, 302, 402, etc.). In particular, the communication module 810 may be responsible for (1) establishing, maintaining, and terminating a session with a one or more portable devices, and/or thin client devices, (2) allowing the exchange of messages within a given session, (3) and allowing multiple sessions to coexist.

In some embodiments, the reader device 802 may include data store 812. Data store 812 may be configured to store any suitable data discussed in connection with FIGS. 2-4 (e.g., data described as being stored at the reader devices 204, 304, and/or 404).

Technical Advantages

Utilizing the techniques disclosed herein, one or more initialization keys (e.g., a symmetric key as described in FIG. 2 or at least one of an asymmetric key pair as described in FIG. 3) may be provided to a thin client device (referred to as "TC") and a reader device (referred to as "Reader") in advance of a transaction. In some embodiments, the one or more initialization keys are stored at the reader device during a manufacturing (or initialization) process of the reader prior to the reader being obtained by an eventual user (e.g., a merchant). The same initialization key(s) are provided to the TC (e.g., from the acceptance cloud of which remote server computer 114 is a part). The initialization key(s) can be utilized by the TC and the reader device to exchange unique public keys in a secure manner (e.g., via a near field communications channel while the TC operates as a contactless portable device) such that the public keys cannot be intercepted and/or obtained by an unauthorized party. The protocols defined above enable the TC and reader device to encrypt these public keys and verify authenticity and validity of the messages they exchange. These techniques provide an advantage over conventional systems that utilize a certification authority to provide certificates that include the other device's public key. The TC and reader device in the examples provided have no need to store certificates or the public key of a certification authority. Thus, the techniques provided herein reduce the amount of data stored. Additionally, utilizing the protocol and initialization key as discussed herein frees the system form the burden of utilizing a certificate authority to obtain certificates in the first place.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

Note that the terms "first," "second" and the like, as used herein, are not restrictive, but can used as labels to represent different devices or objects.

All patents, patent applications, publications, and descriptions mentioned above are herein incorporated by reference in their entirety for all purposes. None is admitted to be prior art.

What is claimed is:

1. A method, comprising:
   identifying, by a protocol management computer, presence of a reader device utilizing a near field communications channel;
   obtaining, by the protocol management computer from a remote server computer, a first initialization key associated with the reader device, wherein a second initialization key corresponding to the first initialization key was previously stored at the reader device during a manufacturing process of the reader device, the first initialization key and the second initialization key being separate instances of a symmetric key;
   transmitting, by the protocol management computer to the reader device, a first encrypted message and a first initialization vector, the first encrypted message being encrypted using the symmetric key and the first initialization vector;
   receiving, by the protocol management computer via the near field communications channel from the reader device, a second encrypted message comprising a first public key associated with the reader device, the second encrypted message being encrypted using a second initialization vector that is generated by the reader device using the first initialization vector; and
   transmitting, by the protocol management computer via the near field communications channel to the reader device, a third encrypted message comprising a second public key associated with the protocol management computer, wherein the third encrypted message is encrypted utilizing a third initialization vector that is generated by the protocol management computer using the second initialization vector that was previously generated using the first initialization vector.

2. The method of claim 1, further comprising obtaining, by the protocol management computer, an identifier associated with the reader device, wherein a request for the first initialization key comprises the identifier, and wherein the identifier is utilized to retrieve the first initialization key.

3. The method of claim 1, wherein the remote server computer is configured to perform terminal processing operations.

4. The method of claim 1, further comprising:
   decrypting, by the protocol management computer, the second encrypted message utilizing the second initialization vector; and
   verifying, by the protocol management computer, the second encrypted message as decrypted.

5. The method of claim 4, further comprising generating a unique identifier for the reader device and a nonce, wherein the symmetric key, the unique identifier, and the nonce is included in the first encrypted message.

6. The method of claim 5, wherein the second encrypted message, as decrypted, further comprises the symmetric key, one or more unique identifiers for the reader device, and the nonce.

7. The method of claim 6, wherein verifying the second encrypted message as decrypted comprises comparing the nonce received in the second encrypted message to the nonce as transmitted in the first encrypted message.

8. The method of claim 4, further comprising generating the second public key and a second private key associated with the protocol management computer in response to verifying the second encrypted message.

9. A protocol management computer, comprising:
   a hardware processor; and
   a non-transitory computer readable medium coupled to the hardware processor, the non-transitory computer readable medium comprising code that, when executable by the hardware processor, causes the protocol management computer to perform operations including:
   identifying presence of a reader device utilizing a near field communications channel;
   obtaining, from a remote server computer, a first initialization key associated with the reader device, wherein a second initialization key corresponding to the first initialization key was previously stored at the reader device during a manufacturing process of the reader device, the first initialization key and the second initialization key being separate instances of a symmetric key;
   transmitting, to the reader device, a first encrypted message and a first initialization vector, the first encrypted message being encrypted using the symmetric key and the first initialization vector;
   receiving, via the near field communications channel from the reader device, a second encrypted message comprising a first public key associated with the reader device, the second encrypted message being encrypted using a second initialization vector that is generated by the reader device using the first initialization vector; and
   transmitting, via the near field communications channel to the reader device, a third encrypted message comprising a second public key associated with the protocol management computer, wherein the third encrypted message is encrypted utilizing a third initialization vector that is generated by the protocol management computer using the second initialization vector that was previously generated using the first initialization vector.

10. The protocol management computer of claim 9, wherein the operations further include negotiating, with the reader device, utilizing the first public key and the second public key, one or more session keys.

11. The protocol management computer of claim 10, wherein the one or more session keys are utilized to establish a secure connection between the protocol management computer and the reader device.

12. The protocol management computer of claim 11, wherein the secure connection conforms to a Bluetooth communications protocol.

13. The protocol management computer of claim 9, wherein the secure connection conforms to a Bluetooth communications protocol.

14. A reader device, comprising:
a hardware processor; and
a non-transitory computer readable medium coupled to the hardware processor, the non-transitory computer readable medium comprising code that, when executable by the hardware processor, causes the reader device to perform operations including:
storing, during a manufacturing process of the reader device, a first initialization key, wherein a second initialization key corresponding to the first initialization key was previously stored at a protocol management computer, the first initialization key and the second initialization key being separate instances of a symmetric key;
receiving, from the protocol management computer via a near field communications channel, a communication comprising a first encrypted message and a first initialization vector, the first encrypted message being encrypted using the symmetric key and the first initialization vector;
in response to receiving the communication, transmitting, via the near field communications channel, a second encrypted message comprising a first public key associated with the reader device, the second encrypted message being encrypted utilizing a second initialization vector that is generated by the reader device using the first initialization vector; and
receiving, from the protocol management computer, via the near field communications channel, a third encrypted message comprising a second public key associated with the protocol management computer, wherein the third encrypted message is encrypted utilizing a third initialization vector that is generated by the protocol management computer using the second initialization vector that was previously generated using the first initialization vector.

15. The reader device of claim 14, wherein the operations further include:
decrypting the first encrypted message utilizing the first initialization vector; and
decrypting the third encrypted message based at least in part on deriving the third initialization vector based at least in part on the second initialization vector.

16. The reader device of claim 15, wherein the second initialization vector comprises twelve left-most bytes of the first initialization vector.

17. The reader device of claim 15, wherein the first encrypted message, the second encrypted message, and the third encrypted message are Application Protocol Data Unit messages defined by ISO/IEC 7816-4 communications standard.

18. The reader device of claim 14, wherein the operations further include generating the first public key as part of a public-private key pair.

19. The reader device of claim 15, wherein the operations further include transmitting, by the reader device to the protocol management computer, a fourth message, the fourth message indicating that the third encrypted message was received successfully.

* * * * *